(12) United States Patent
Yamashita

(10) Patent No.: US 9,716,820 B2
(45) Date of Patent: Jul. 25, 2017

(54) REMOTE-CAMERA CONTROL METHOD, REMOTE PHOTOGRAPHY SYSTEM, AND SERVER

(71) Applicant: Panasonic Intellectual Property Corporation of America, Torrance, CA (US)

(72) Inventor: Kazuhiko Yamashita, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/918,555

(22) Filed: Oct. 20, 2015

(65) Prior Publication Data

US 2016/0127634 A1    May 5, 2016

(30) Foreign Application Priority Data

Nov. 4, 2014 (JP) ................................ 2014-224435

(51) Int. Cl.
*H04N 5/232* (2006.01)

(52) U.S. Cl.
CPC ..... *H04N 5/23206* (2013.01); *H04N 5/23293* (2013.01)

(58) Field of Classification Search
CPC ................. H04N 5/23206; H04N 5/23293
See application file for complete search history.

(56) References Cited

U.S. PATENT DOCUMENTS

| 2003/0072491 A1* | 4/2003 | Sirivara | G06F 21/10 |
| | | | 382/220 |
| 2010/0271490 A1* | 10/2010 | Jung | H04N 1/00132 |
| | | | 348/207.1 |

FOREIGN PATENT DOCUMENTS

JP    2014-099763    5/2014

\* cited by examiner

*Primary Examiner* — Twyler Haskins
*Assistant Examiner* — Padma Haliyur
(74) *Attorney, Agent, or Firm* — Greenblum & Bernstein, P.L.C.

(57) ABSTRACT

A remote-camera control method includes: obtaining first remote image data and terminal image data acquired by photography performed by a remote camera and a terminal camera in a same time segment; authenticating the user terminal by comparing the two pieces of image data with each other and by determining that the user terminal is in a photography spot of the remote camera when an identical subject is found in both the pieces of image data; and providing second remote image data acquired by the remote camera to the user terminal after the user terminal is authenticated.

20 Claims, 29 Drawing Sheets

FIG. 5

| CAMERA ID | USER ID | CONNECTION CONDITION |
|---|---|---|
| CID01 | TID01 | — |
| CID01 | TID02 | — |
| CID01 | TID03 | 10/05/11:00 - 10/05/12:00 |
| CID01 | TID04 | 11/02/15:00 - 11/02/15:10 |
| CID02 | TID04 | 11/03/15:00 - 11/03/16:00 |
| ⋮ | ⋮ | |

411

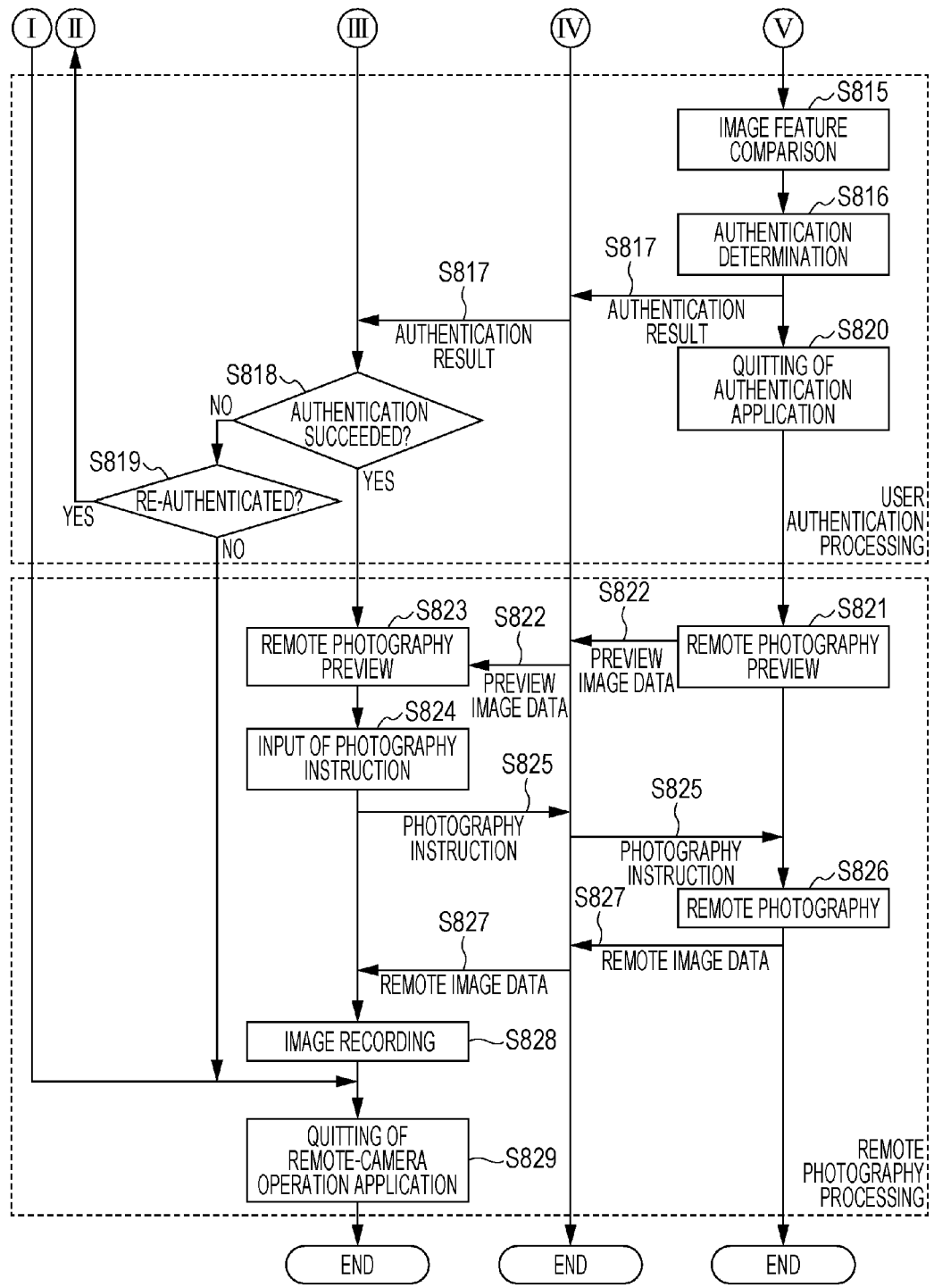

FIG. 13

| USER ID | CONNECTION CONDITION |
|---|---|
| TID01 | — |
| TID02 | — |
| TID03 | 10/05/11:00 - 10/05/12:00 |
| TID04 | 11/02/15:00 - 11/02/15:10 |
| TID04 | 11/03/15:00 - 11/03/16:00 |
| ⋮ | |

1211

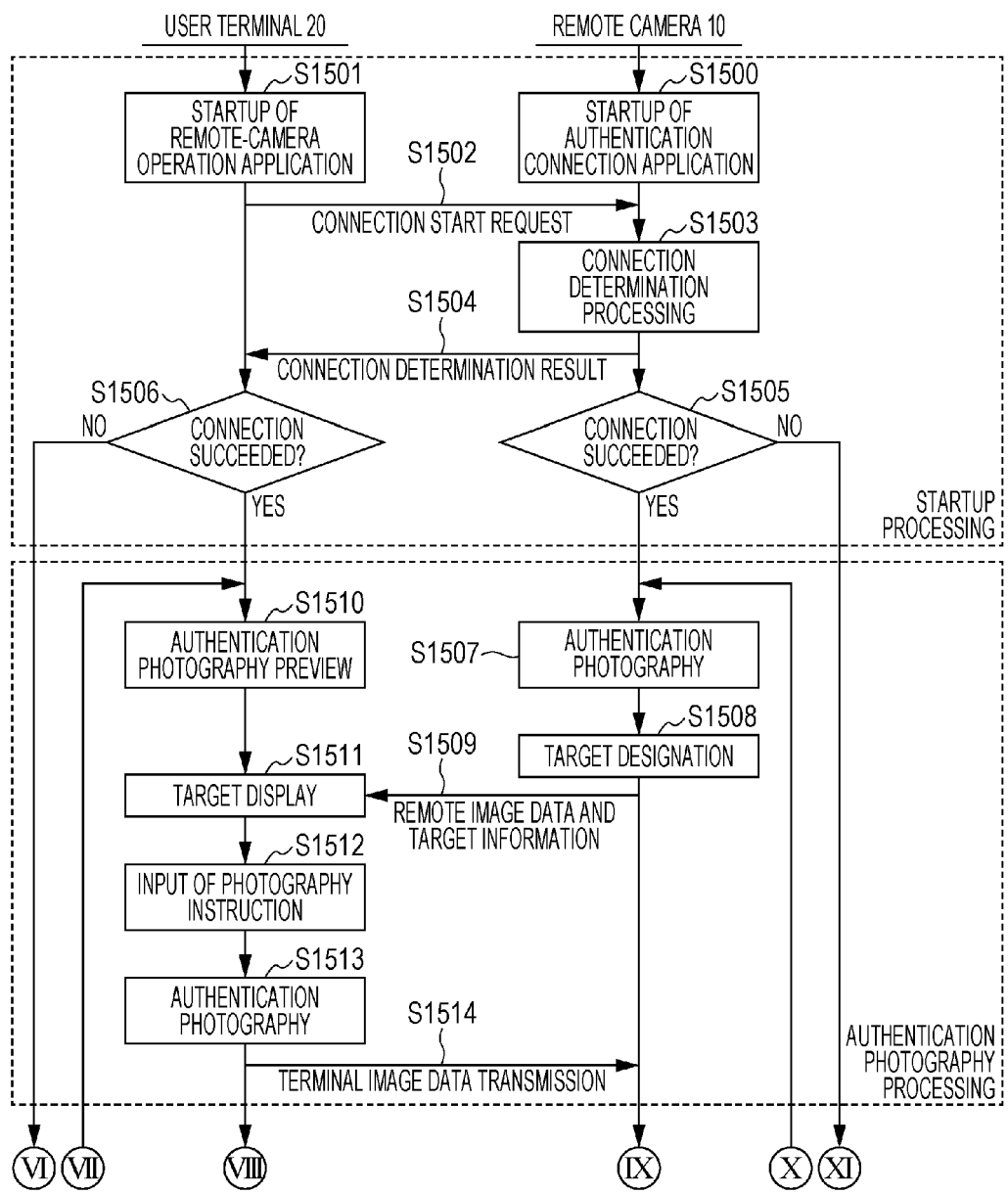

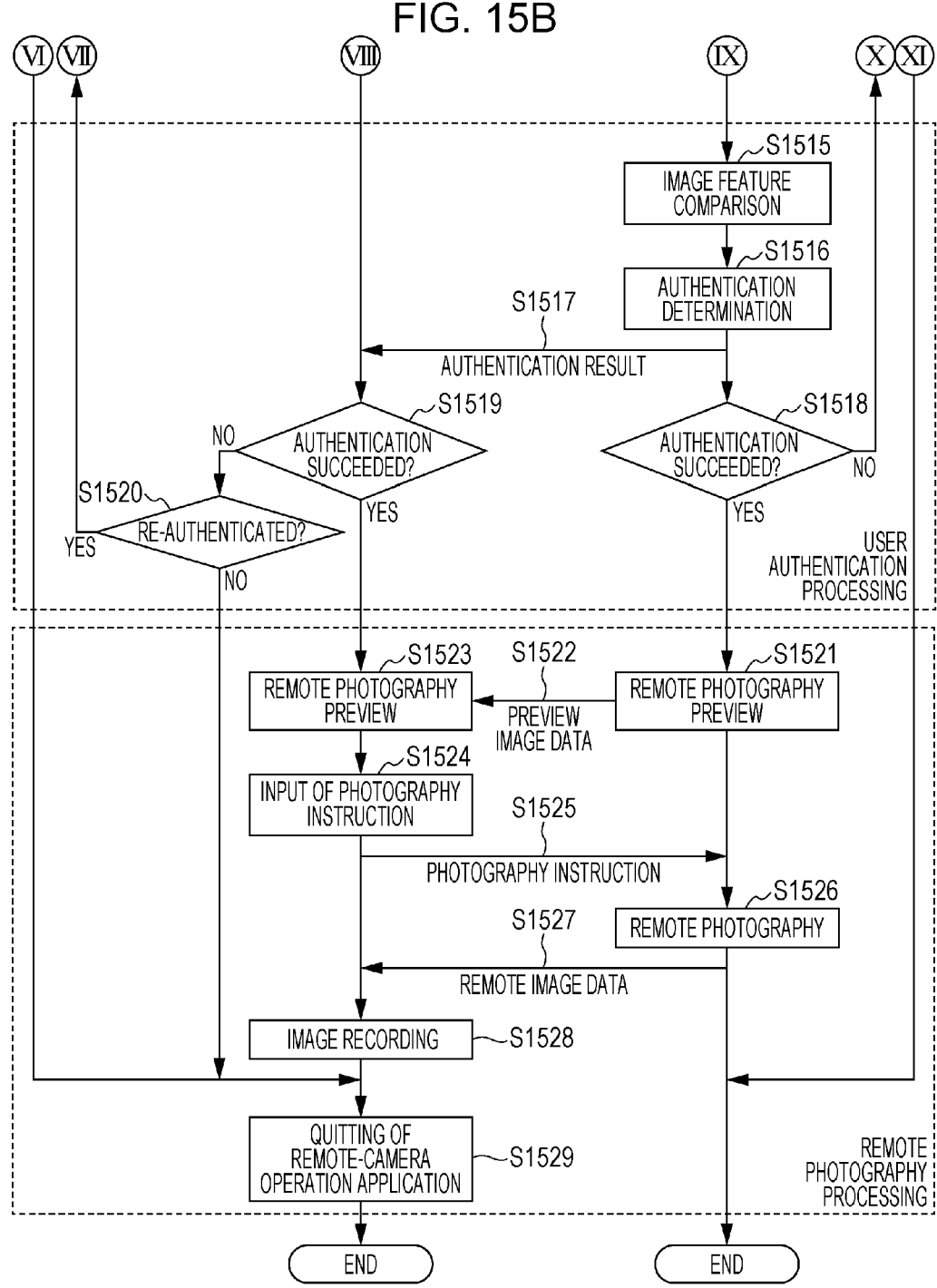

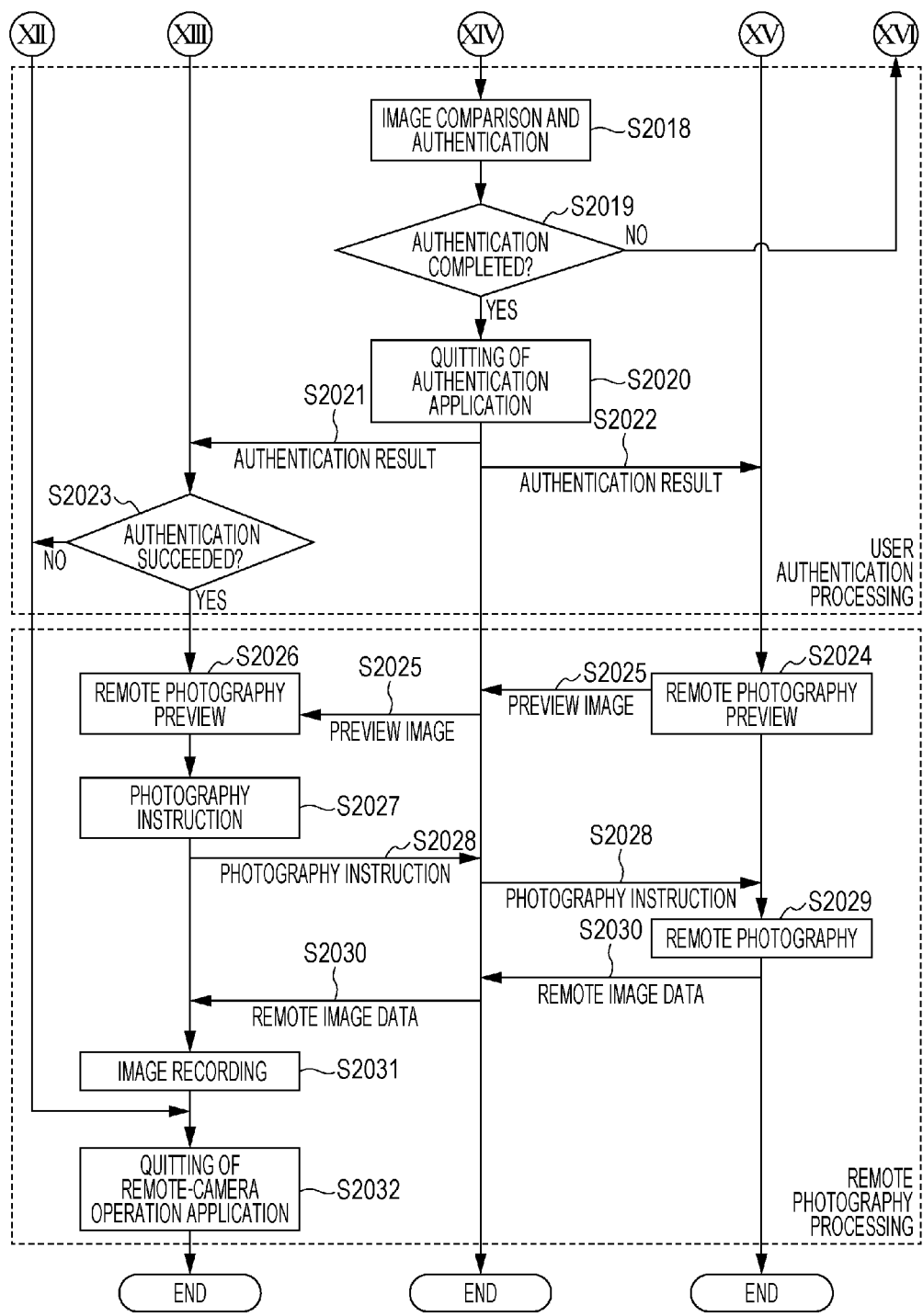

REMOTE-CAMERA CONTROL METHOD, REMOTE PHOTOGRAPHY SYSTEM, AND SERVER

BACKGROUND

1. Technical Field

The present disclosure relates to a remote-camera control method, a remote photography system, and a server for performing photography using a remotely operable camera installed at a photography spot in a sightseeing area or the like.

2. Description of the Related Art

For example, a study is being conducted on a service that allows users to perform photography using a camera that is installed such that a place where users wish to perform photography (such a place is hereinafter referred to as a "photography spot"), for example, a scenic place in a sightseeing area, a theme park, or the like, is in the photography range of the camera. With this service, since the user can obtain a clear image having less motion blur than an image resulting from photography using a camera or the like in the possession of the user, it is possible to enhance the degree of satisfaction.

Since such photography is performed to memorialize a visit to a photography spot, it is desirable that the service be used only by users who are present in the photography spot. Accordingly, there is a method in which a face picture of a user is pre-registered, and the service is provided only when it is determined that a person shown in the registered face picture and a person captured on an installed camera are the same (see, for example, Japanese Unexamined Patent Application Publication No. 2014-99763).

SUMMARY

In one general aspect, the techniques disclosed here feature a remote-camera control method used for a remote photography system including a remote camera and a user terminal. The remote camera has a communication function and is installed at a position where a photography range of the remote camera includes a photography spot, and the user terminal has a communication function and a terminal camera. The method includes: obtaining first remote image data and terminal image data acquired by photography performed by the remote camera and the terminal camera in a same time segment; authenticating the user terminal by comparing the first remote image data and the terminal image data with each other and by determining that the user terminal is in the photography spot when an identical subject is found in both the first remote image data and the terminal image data; and providing second remote image data acquired by the remote camera to the user terminal after the user terminal is authenticated.

With the configuration described above, the operation of the remote camera can be permitted only when the user terminal is present in the photography spot of the remote camera.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 illustrates one example of a connection permission list;

FIGS. 8A and 8B illustrate a sequence diagram of one example of remote-camera control processing;

FIG. 13 illustrates one example of a connection permission list;

FIGS. 15A and 15B illustrate a sequence diagram of one example of remote-camera control processing;

FIGS. 20A and 20B illustrate a sequence diagram of one example of remote-camera control processing;

DETAILED DESCRIPTION

With a method in which a face picture is pre-registered as described above, in practice, there is a possibility that, for example, when a face picture of another person is registered, a service as described above is provided to a user who is not present in the range of a corresponding photography spot.

The present disclosure provides a remote-camera control method, a remote photography system, and a server that permits a remote camera to be operated only when a user terminal is present in the photography spot of the remote camera.

<Overview>

Before embodiments are described below, an overview of a remote photography system in the present disclosure will be described first. The remote photography system is a system for providing a service in which a user uses a camera installed at a photography spot in a sightseeing area, a theme park, or the like to take a picture that satisfies the user.

Figure 1:
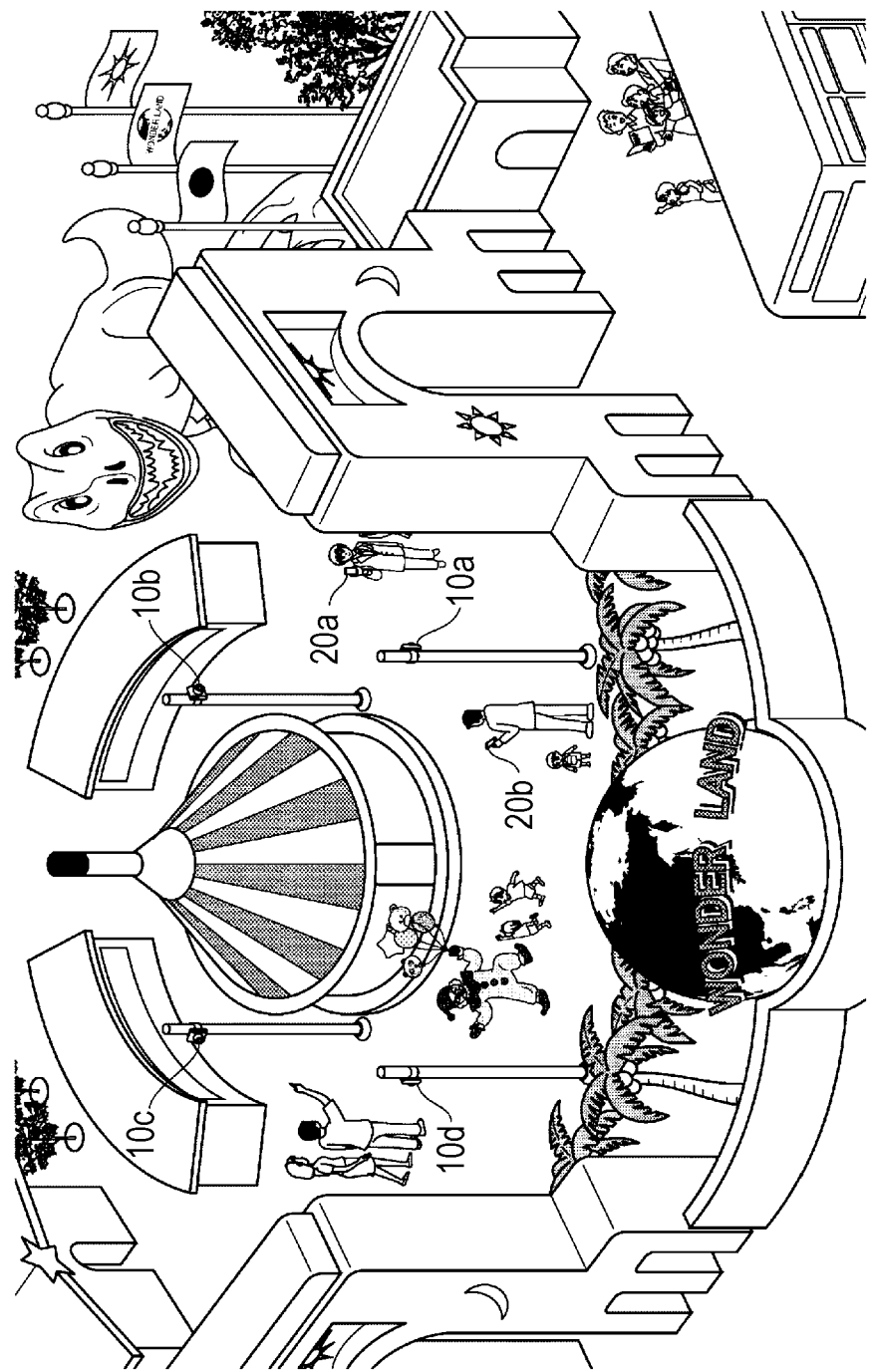
FIG. 1 is a schematic diagram illustrating an overview of a remote photography system according to the present disclosure.

FIG. 1 is a schematic diagram illustrating an overview of a remote photography system. As illustrated in FIG. 1, remote cameras 10 (10a, 10b, . . . ) that have a communication function and that can be remotely operated are installed at photography spots, respectively. Users possess user terminals 20 (20a, 20b, . . . ) that have a communication function and that have cameras built therein. Examples of the user terminals 20 include smartphones.

One remote cameras 10 and one user terminal 20 are connected to each other so that they can transmit/receive arbitrary data, such as instructions and images, to/from each other by using the communication functions. The connection between the remote camera 10 and the user terminal 20 may be established by any scheme. For example, the connection may be a connection through a network, such as the so-called Internet, or may be a connection using a direct communication scheme, such as the so-called ad-hoc mode.

Although not illustrated, a camera management server 30 may also be provided in order to relay and/or manage connections between the remote cameras 10 and the user terminals 20. In such a case, the place where the camera management server 30 is provided is not particularly limiting.

Figure 2:
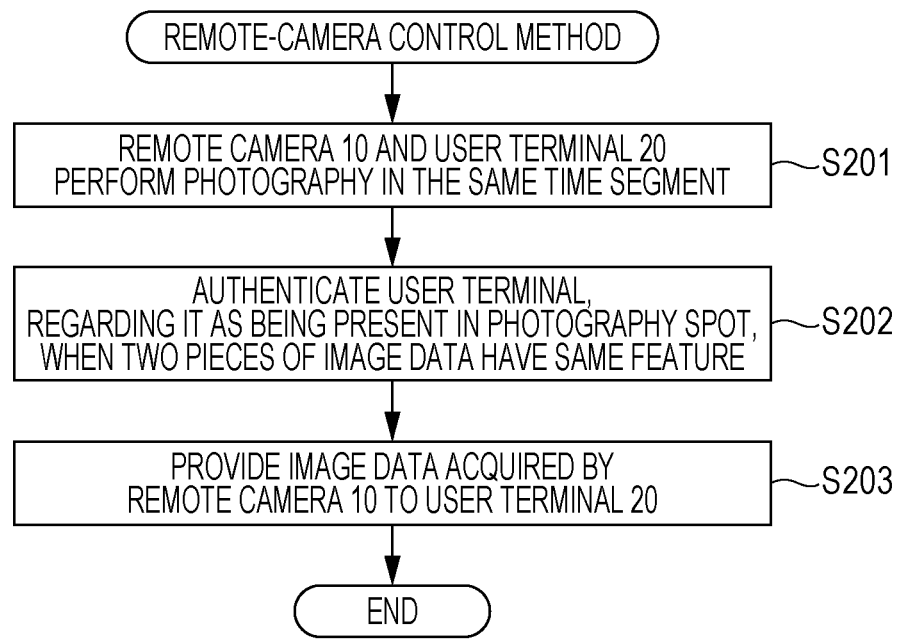
FIG. 2 is a flowchart illustrating an overview of a remote-camera control method in the present disclosure.

FIG. 2 is a flowchart illustrating an overview of a remote-camera control method in the present disclosure.

The remote-camera control method in the present disclosure includes synchronization photography processing for obtaining remote image data corresponding to first remote image data and terminal image data acquired by photography performed by the remote camera 10 and a camera (hereinafter referred to as a "terminal camera"), included in the user terminal 20, in the same time segment (step S201). The synchronization photography processing is to obtain images for authentication and is thus also referred to as "authentication photography processing".

The remote-camera control method in the present disclosure further includes user authentication processing (step S202) for authenticating the user terminal 20 by comparing the remote image data and the terminal image data with each other, the remote image data and the terminal image data being obtained in the authentication photography processing, and by determining that the user terminal 20 is in a photography spot when an identical subject is found in both the remote image data and the terminal image data.

The remote-camera control method in the present disclosure further includes, after the user authentication processing, image providing processing (step S203) for providing remote image data, corresponding to second remote image data, acquired by the remote camera 10 to the authenticated user terminal 20.

Thus, only when the user terminal 20 is present in the photography spot, an image acquired by the remote camera 10 can be provided to the user of the authenticated user terminal 20.

Embodiments of the present disclosure will be described below with reference to the accompanying drawings. The descriptions given below represent merely examples of the present disclosure, and numerical values, shapes, constituent elements, steps, and an order of steps are not intended to limit the present disclosure. Of the constituent elements in the embodiments, constituent elements not set forth in the descriptions will be described as optional constituent elements. In all of the embodiments, what are disclosed therein may also be combined together.

1. First Embodiment

The operation of a remote photography system 1 in a first embodiment can be broadly classified into startup processing, authentication photography processing, user authentication processing, and remote photography processing.

The startup processing is processing for establishing communication connections between one remote camera 10, one user terminal 20, and the camera management server 30.

The authentication photography processing is processing in which the remote camera 10 and the user terminal 20 photograph an identical subject in the same time segment to obtain two pieces of image data used for the user authentication processing.

The user authentication processing is processing in which image feature comparison is performed on the two pieces of image data obtained in the authentication photography processing and the user terminal 20 is authenticated when the two pieces of image data have the same feature of the subject.

The remote photography processing is processing in which the remote camera 10 performs photography in accordance with an operation of the user terminal 20 authenticated in the user authentication processing and provides remote image data, corresponding to the second remote image data, generated in the photography to the user terminal 20.

A configuration for realizing the above-described operation and details of the above-described operation will be described below with reference to the accompanying drawings.

<1-1. Configuration>

Figure 3:
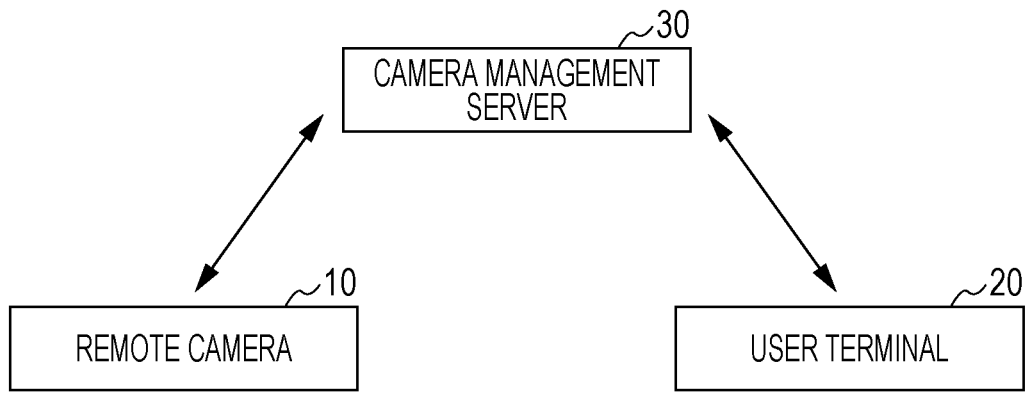
FIG. 3 is a block diagram illustrating the configuration of a remote photography system.

FIG. 3 is a block diagram illustrating the configuration of the remote photography system 1. As illustrated in FIG. 3, the remote photography system 1 includes at least one remote camera 10, at least one user terminal 20, and the camera management server 30. Each remote camera 10 and the camera management server 30 perform communication through a network. Each user terminal 20 communicates with the camera management server 30 through a mobile-phone communication network or another network.

<1-1-1. Camera Management Server 30>

The camera management server 30 relays a communication between one remote camera 10 installed at a photography spot and one user terminal 20 to transfer data between the remote camera 10 and the user terminal 20, which are connected to different networks. The camera management server 30 mediates a connection so that a plurality of users do not use one remote camera 10 at the same time.

Figure 4A:
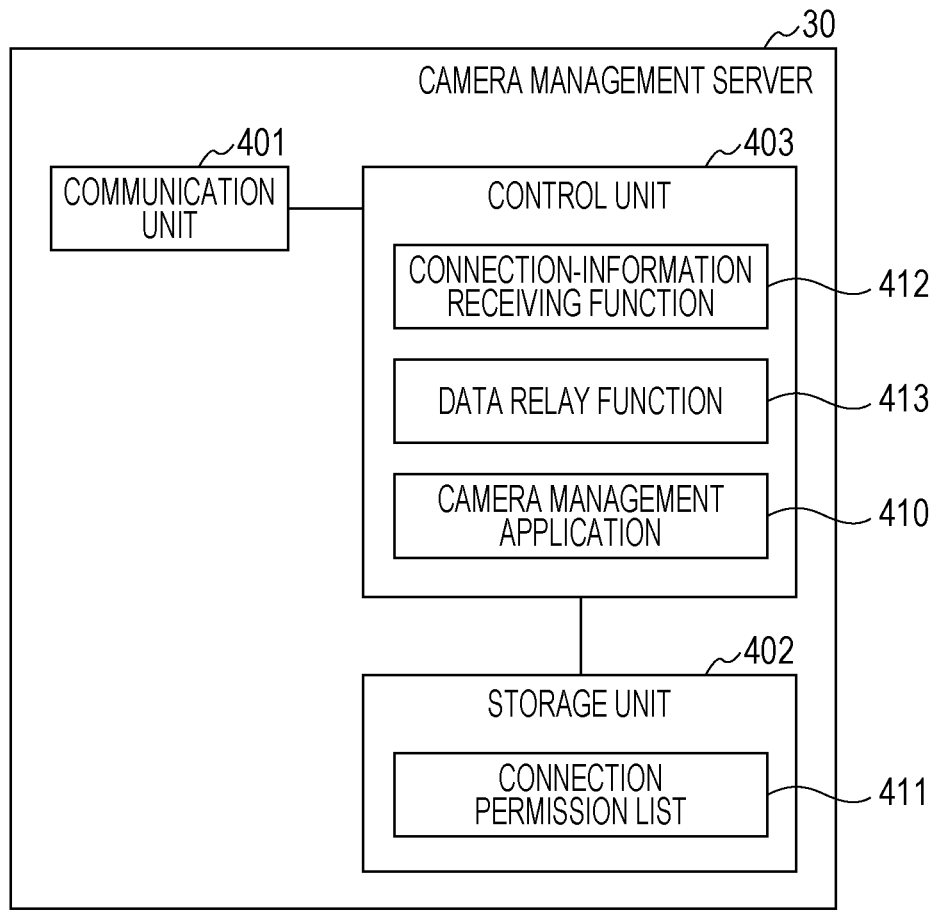
FIG. 4A is a block diagram illustrating an example of the functional configuration of a camera management server.

The camera management server 30 is an information processing apparatus and is implemented by, for example, a personal computer. FIG. 4A is a block diagram illustrating an example of the functional configuration of the camera management server 30. As illustrated in FIG. 4A, the functional configuration of the camera management server 30 includes a communication unit 401, a storage unit 402, and a control unit 403.

(Communication Unit 401)

The communication unit 401 is implemented by a large scale integration (LSI) for performing wireless communication and wired communication. The communication unit 401 has a function for performing wireless communication through a mobile-phone communication network and transmits/receives data to/from each user terminal 20. The communication unit 401 also has a function for performing wired communication or wireless communication through a network, such as the Internet, and transmits/receives data to/from each remote camera 10 or each user terminal 20 that can connect to the network.

(Storage Unit 402)

The storage unit 402 is implemented by, for example, a nonvolatile memory, such as a ferroelectric random-access memory (FeRAM), and has a function for holding data. The storage unit 402 holds a connection permission list 411 described below.

(Control Unit 403)

The control unit 403 includes a processor and a memory and controls an overall operation of the camera management server 30. In this case, the processor executes a program stored in the memory to thereby realize individual functions of the control unit 403. The control unit 403 has, as its main functions, a connection-information receiving function 412 and a data relay function 413 for relaying data between one remote camera 10 and one user terminal 20. A camera management application 410 is pre-installed and operates as a function of the control unit 403.

The individual functions of the control unit 403 will be described below.

(Connection-Information Receiving Function 412)

The connection-information receiving function 412 is, for example, a function for obtaining identifier (ID) information of the remote camera 10 and the user terminal 20, in order for the camera management application 410 to control whether or not a connection between the remote camera 10 and the user terminal 20 can be established.

(Data Relay Function 413)

The data relay function 413 is a function for transmitting data, received from the remote camera 10, to the user terminal 20 and for transmitting data, received from the user terminal 20, to the remote camera 10.

Examples of the data that is transmitted by the remote camera 10 and that is to be relayed include a result of user authentication, preview image data during remote photography, and remote image data during remote photography. Examples of the data that is transmitted by the user terminal 20 and that is to be relayed include a photography instruction during authentication photography, terminal image data for the authentication photography, and a photography instruction during remote photography.

(Camera Management Application 410)

Figure 4B:
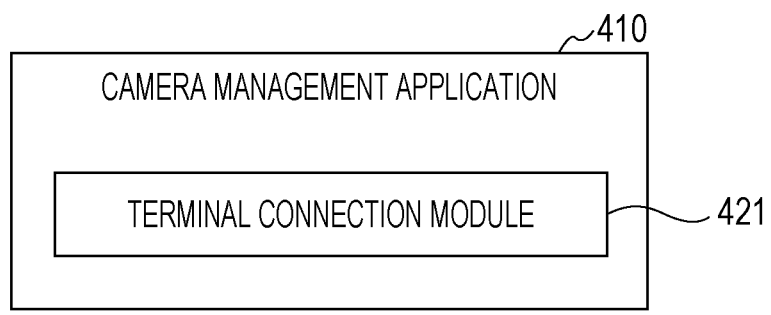
FIG. 4B is a block diagram illustrating an example of the data configuration of a camera management application.

The camera management application 410 is a program pre-installed in the camera management server 30, as described above. The camera management application 410 includes a terminal connection module 421, as illustrated in FIG. 4B. By using the connection-information receiving function 412 of the control unit 403, the terminal connection module 421 controls access of the user terminal 20 which is to use the remote photography system 1, based on the connection permission list 411.

(Connection Permission List 411)

Now, a description will be given of the connection permission list 411. FIG. 5 illustrates one example of the connection permission list 411. In the illustrated example, the connection permission list 411 is an information list in which three kinds of information, that is, camera IDs for identifying the remote cameras 10, user IDs for identifying the user terminals 20, and connection conditions stating when these combinations can be used, are associated with each other.

In FIG. 5, the connection condition for the remote camera 10 having a camera ID "CID01" and the user terminal 20 having a user ID "TID01" is indicated by "–". This means that the user terminal 20 having the user ID "TID01" can connect to the remote camera 10 having the camera ID "CID01", regardless of the date and time.

The connection condition for the remote camera 10 having a camera ID "CID02" and the user terminal 20 having a user ID "TID04" is "11/03/15:00-11/03/16:00". This means that the user terminal 20 having the user ID "TID04" can connect to the remote camera 10 having the camera ID "CID02" in the period of 15:00 to 16:00 on November 3.

When one user terminal 20 attempts to connect to one remote camera 10 with a combination or at date and time, the combination and the date and time not being shown in the connection permission list 411, the camera management server 30 does not permit the connection. Thus, in such a case, the user terminal 20 cannot perform user authentication with the remote camera 10.

It is desirable that the connection permission list 411 be held in a database format with which it is easy for the camera management server 30 to perform external operations, such as registration and deletion. A method for implementing the connection permission list 411 is not particularly limiting, as long as information that conforms to the above-described effect can be obtained. For example, the method may be a simple method in which a system administrator uploads data of an externally created connection permission list 411 to the camera management server 30.

The connection permission list 411 is created by obtaining, from the user, the camera ID of the remote camera 10 he or she wishes to use, the user ID of the user terminal 20 to be used, and a connection condition. Possible examples of a method for obtaining the information include, but are not particularly limited to, a method for obtaining the information by using a dedicated terminal and a method for obtaining the information through the Internet or the like.

The camera IDs are unique identifiers of all of the remote cameras 10 connected to the remote photography system 1 and are set in advance.

The user IDs are identifiers unique to all the user terminals 20 that can be connected to the remote photography system 1 or unique to all users who use the remote photography system 1. Each user ID may be, for example, an identifier constituted by the model number and the serial number of the user terminal 20 or may be an identifier assigned during creation of the connection permission list 411. Each user ID may also be an identifier assigned during user registration in the remote photography system 1. When the user ID is an ID that is unique to each user, not an ID that is unique to each user terminal 20, one user can connect to the remote photography system 1 by using any of the user terminals 20 in the possession of the user. Any ID system that can exclude a terminal having no connection authority may be used, which is not depart from the scope of the present embodiment.

<1-1-2. Remote Camera 10>

Next, a description will be given of the configuration of each remote camera 10. The remote camera 10 is an imaging device for acquiring an image at a photography spot.

Figure 6A:
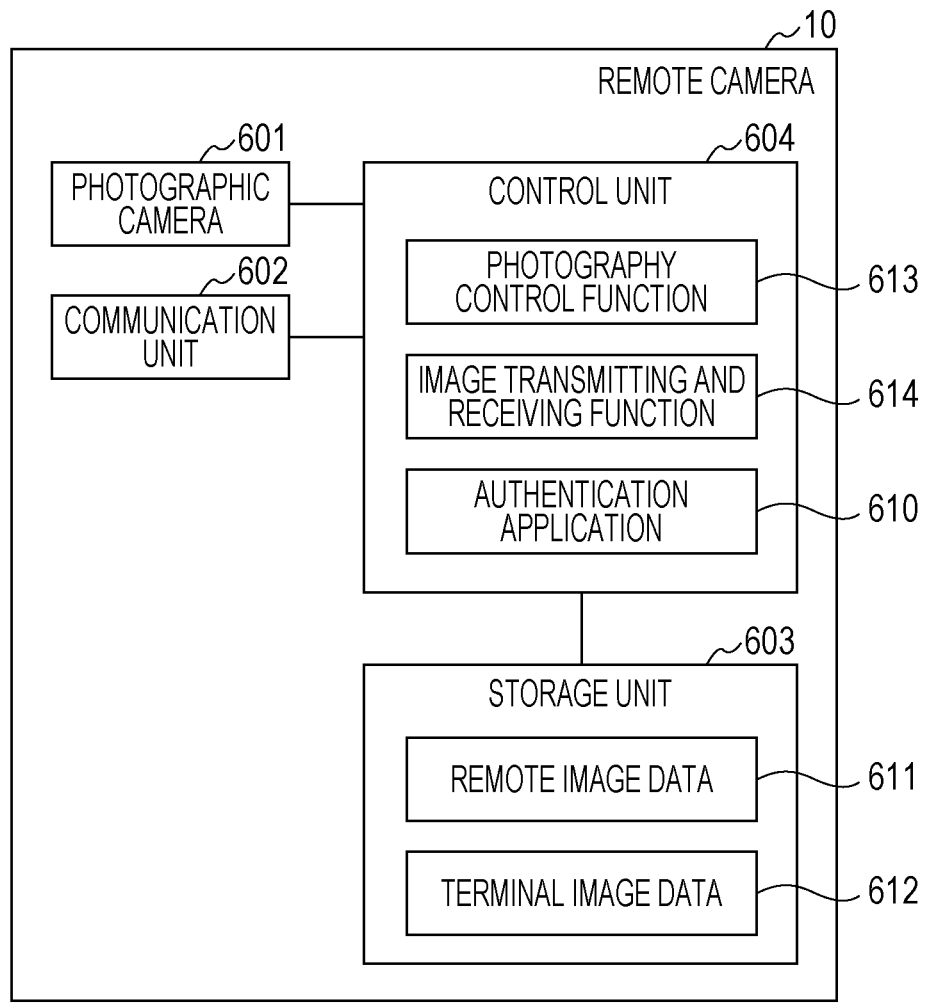
FIG. 6A is a block diagram illustrating an example of the functional configuration of a remote camera.

FIG. 6A is a block diagram illustrating an example of the functional configuration of each remote camera 10. As illustrated in FIG. 6A, the functional configuration of each remote camera 10 includes a photographic camera 601, a communication unit 602, a storage unit 603, and a control unit 604.

(Photographic Camera 601)

The photographic camera 601 performs photography and generates image data in response to a photography instruction from the control unit 604. The photographic camera 601 generates preview image data, remote image data 611, corresponding to the first image data, during the authentication photography, remote image data, corresponding to the second image data, during the remote photography, and so on. For acquiring a moving image, the photographic camera 601 performs sequential photography to generate a plurality of pieces of image data, and for acquiring a still image, the photographic camera 601 performs one-shot photography to generate a piece of image data.

(Communication Unit 602)

The communication unit 602 is implemented by an LSI for performing wireless communication and wired communication. The communication unit 602 has a function for performing wired communication or wireless communication through a network, such as the Internet, and transmits/receives data to/from the camera management server 30.

(Storage Unit 603)

The storage unit 603 is implemented by, for example, a nonvolatile memory, such as a FeRAM, and has a function for holding data. While user authentication processing described below is performed, the storage unit 603 temporarily stores remote image data 611 generated as a result of photography performed by the photographic camera 601 and terminal image data 612 obtained from the user terminal 20 via the communication unit 602.

(Control Unit 604)

The control unit 604 includes a processor and a memory and controls an overall operation of the remote camera 10. The processor executes a program stored in the memory to thereby realize individual functions of the control unit 604.

The control unit 604 has a photography control function 613 and an image transmitting and receiving function 614 as main functions. An authentication application 610 is pre-installed in the remote camera 10 and operates as a function of the control unit 604.

The individual functions of the control unit 604 will be described below.

(Photography Control Function 613)

The photography control function 613 is a function for controlling photography using the photographic camera 601 and performs control for generating preview image data, remote image data 611 during authentication photography, and remote image data during remote photography.

(Image Transmitting and Receiving Function 614)

The image transmitting and receiving function 614 is a function for controlling transmission/reception of image data to/from outside by using the communication unit 602. More specifically, the image transmitting and receiving function 614 performs, via the camera management server 30, reception of the terminal image data 612 from the user terminal 20 during authentication photography, transmission of preview image data to the user terminal 20 during remote photography, and transmission of remote image data to the authenticated user terminal 20 during remote photography.

(Authentication Application 610)

Figure 6B:
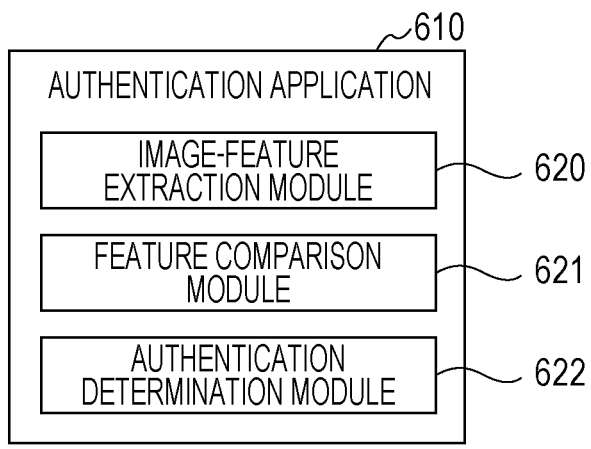
FIG. 6B is a block diagram illustrating an example of the data configuration of an authentication application.

The authentication application 610 is a program pre-installed in the remote camera 10, as described above. As illustrated in FIG. 6B, the authentication application 610 includes an image-feature extraction module 620, a feature comparison module 621, and an authentication determination module 622.

The image-feature extraction module 620 extracts pieces of feature data from the remote image data 611 and the terminal image data 612. The feature comparison module 621 compares the pieces of feature data with each other. Based on whether or not the two pieces of image data 611 and 612 have the same feature, the authentication determination module 622 generates an authentication result indicating whether or not authentication has succeeded or failed.

(Remote Image Data 611)

The remote image data 611 is image data generated as a result of photography performed by the photographic camera 601. A possible data format of the image data is a format in which data is separated into luminance signals and color difference signals, such as a YUV format generally used in image processing, or a raw format for signals generated by the photographic camera 601. The data format is not particularly limiting, as long as it satisfies an image size and an image quality that are sufficient to compare the remote image data 611 and the terminal image data 612 with each other.

(Terminal Image Data 612)

The terminal image data 612 is image data generated as a result of photography by the user terminal 20 and obtained via the communication unit 602. It is desirable that the data format have the same condition as the data format of the remote image data 611 in order to perform the comparison.

<1-1-3. User Terminal 20>

Next, a description will be given of the configuration of each user terminal 20. The user terminal 20 is a mobile information processing terminal and is implemented by, for example, a smartphone or a tablet terminal.

Figure 7A:
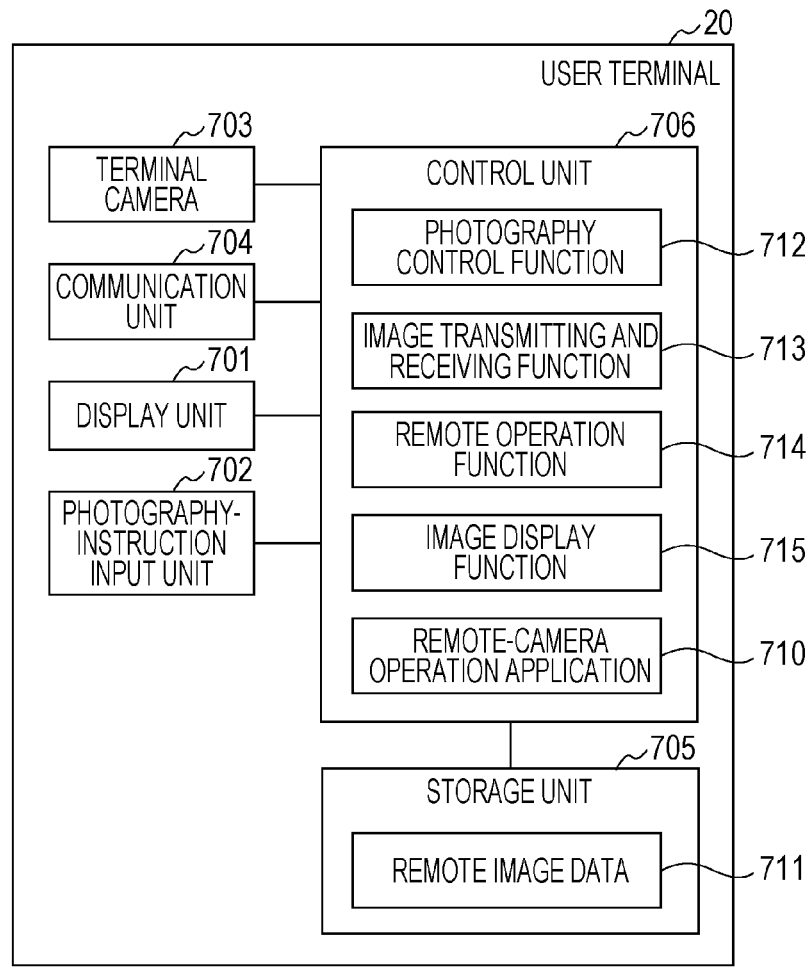
FIG. 7A is a block diagram illustrating an example of the functional configuration of a user terminal.

FIG. 7A is a block diagram illustrating an example of the functional configuration of each user terminal 20. As illustrated in FIG. 7A, the functional configuration of each user terminal 20 includes a display unit 701, a photography-instruction input unit 702, a terminal camera 703, a communication unit 704, a storage unit 705, and a control unit 706.

(Display Unit 701)

The display unit 701 is implemented by a display and a display control LSI. One example of the display is a liquid-crystal display. The display control LSI has a function for obtaining image data indicating what image is to be displayed and for displaying, on the display, an image represented by the image data.

(Photography-Instruction Input Unit 702)

The photography-instruction input unit 702 is implemented by a touch pad or the like and has a function for sensing a user's contact operation on the basis of a change in an electrostatic capacitance and notifying the control unit 706 about an instruction from the user, the instruction being given by the contact operation. The photography-instruction input unit 702 is used for the user to move a cursor displayed on the liquid-crystal display or to input, for example, a user instruction for selecting a display object, such as an icon.

(Terminal Camera 703)

Upon receiving a photography instruction from the control unit 706, the terminal camera 703 performs photography and generates image data. The terminal camera 703 generates preview image data during authentication photography, terminal image data, and so on. For acquiring a moving image, the photographic camera 601 performs sequential photography to generate a plurality of pieces of image data, and for acquiring a still image, the photographic camera 601 performs one-shot photography to generate a piece of image data. In the first embodiment, the terminal camera 703 is provided on a surface on which the display unit 701 of the user terminal 20 is provided.

(Communication Unit 704)

The communication unit 704 is implemented by an LSI for performing wireless communication. The communication unit 704 has, for example, a function for performing wireless communication, such as mobile-phone communication and wireless local-area network (LAN) communication, and transmits/receives data to/from the camera management server 30.

(Storage Unit 705)

The storage unit 705 is implemented by, for example, a nonvolatile memory, such as a FeRAM, and has a function for holding data. Remote image data 711 generated as a result of photography performed by the remote camera 10 is stored in the storage unit 705.

(Control Unit 706)

The control unit 706 includes a processor and a memory and controls an overall operation of the user terminal 20. The processor executes a program stored in the memory to thereby realize individual functions of the control unit 706. The control unit 706 executes a function corresponding to a user instruction input from the photography-instruction input unit 702 and data obtained from the camera management server 30 through communication. The control unit 706 has a photography control function 712, an image transmitting and receiving function 713, a remote operation function 714, and an image display function 715 as main functions. A remote-camera operation application 710 is pre-installed in the user terminal 20 and operates as a function of the control unit 706.

The individual functions of the control unit 706 will be described below.

(a) Photography Control Function 712

The photography control function 712 is a function for controlling photography using the terminal camera 703 and is a function for performing control for generating preview image data and terminal image data during authentication photography.

(b) Image Transmitting and Receiving Function 713

The image transmitting and receiving function 713 is a function for controlling transmission/reception of image data to/from outside by using the communication unit 704. More specifically, the image transmitting and receiving function 713 performs, via the camera management server 30, transmission of terminal image data to the remote camera 10 during authentication photography and reception of preview image data and the remote image data 711 from the remote camera 10 during remote photography.

(c) Remote Operation Function 714

The remote operation function 714 is a function for controlling the remote camera 10 via the camera management server 30 by using the communication unit 704 and issues a photography instruction in the present embodiment.

(d) Image Display Function 715

The image display function 715 displays a preview image and terminal image data generated by the terminal camera 703, a preview image and the remote image data 711 received from the remote camera 10, and so on.

(e) Remote-Camera Operation Application 710

Figure 7B:
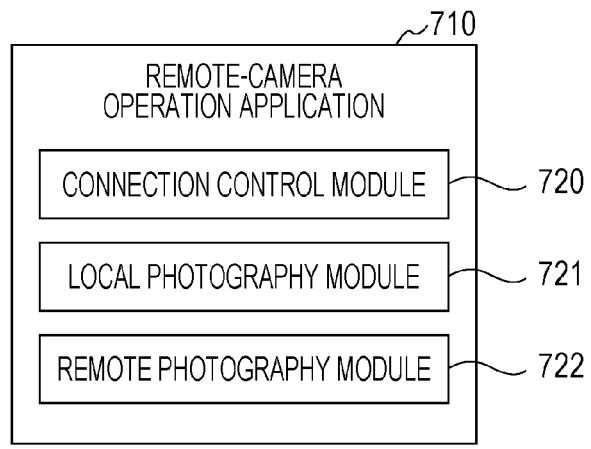
FIG. 7B is a schematic diagram illustrating an example of the data configuration of a remote-camera operation application.

The remote-camera operation application 710 is a program pre-installed in the user terminal 20, as described above. As illustrated in FIG. 7B, the remote-camera operation application 710 includes a connection control module 720, a local photography module 721, and a remote photography module 722.

The connection control module 720 establishes a communication connection with the camera management server 30. The local photography module 721 displays, on the display unit 701, the preview image data generated by the terminal camera 703. The remote photography module 722 displays, on the display unit 701, the preview image data received from the remote camera 10.

(Remote Image Data 711)

The remote image data 711 is image data generated as a result of photography by the remote camera 10 and obtained via the communication unit 704 and is stored in the storage unit 705. The image data is stored, for example, in a data format, such as a Joint Photographic Experts Group (JPEG) format, commonly used for picture data in smartphones and personal computers.

<1-2. Operation>

The operation of the remote photography system 1 will be described below with reference to FIGS. 8A, 8B, 9, and 10A to 10C.

As described above, the operation of the remote photography system 1 can be broadly classified into the startup processing, the authentication photography processing, the user authentication processing, and the remote photography processing.

Figure 8A:
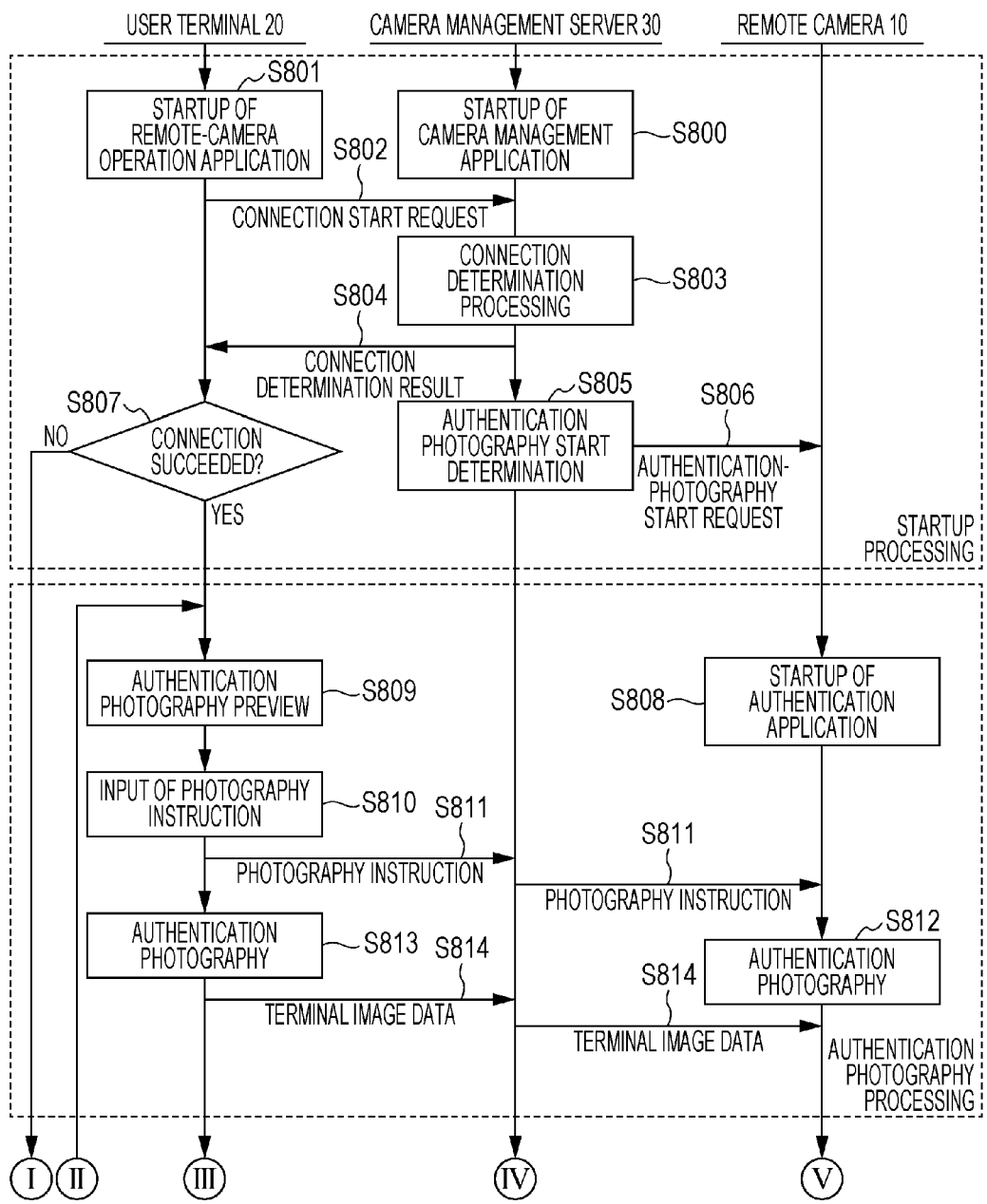

The processing will be described below in sequence with reference to FIGS. 8A and 8B.

<1-2-1. Startup Processing>

A description will be given of the startup processing in the remote photography system 1.

First, the camera management server 30 starts up the camera management application 410 (step S800). Since the camera management server 30 needs to be ready for a connection start request from each user terminal 20 any time, the camera management application 410 is started up during startup of the camera management server 30.

Figure 9:
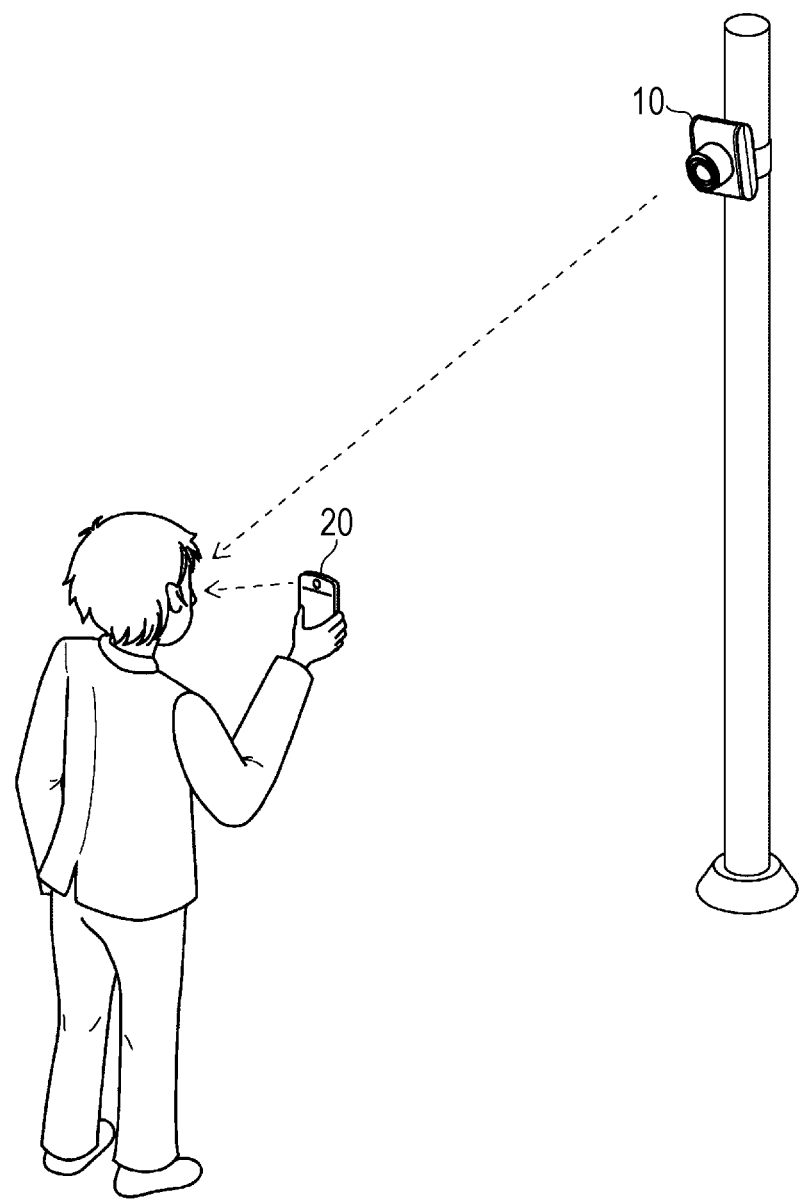
FIG. 9 illustrates a user's action in the remote photography system.

Upon arriving at a photography spot, the user confirms that he or she is at a position in the photography range of one remote camera 10, as illustrated in FIG. 9, and operates the user terminal 20 to start up the pre-installed remote-camera operation application 710 (step S801).

Upon startup of the remote-camera operation application 710, the connection control module 720 operates first to execute connection processing for connecting to the remote camera 10 (step S802). In the connection processing, the connection control module 720 transmits the user ID of the user terminal 20, together with a connection start request, to the camera management server 30. When the user has given a request for using a plurality of remote cameras 10 and a registration for a plurality of remote cameras 10 has been made in the connection permission list 411 in the camera management server 30, the camera ID of the remote camera 10 to which he or she wishes to connect is transmitted together with the user ID and the connection start request. The camera ID can be designated using, for example, a method in which a list of camera IDs is displayed on the display unit 701 of the user terminal 20 to allow the user to select any of the camera IDs, a method for obtaining the camera ID of a corresponding one of the remote cameras 10 on the basis of position information of a global positioning system (GPS), and a method for obtaining the camera ID of an available one of the remote camera 10 on the basis of a photography time.

When the camera management server 30 receives the connection start request from the user terminal 20, the terminal connection module 421 in the camera management application 410 performs connection determination processing by using the received user ID of the user terminal 20 (step S803). In the connection determination processing, items that can be narrowed down using the user ID and the current time are searched for in the connection permission list 411. When the camera ID is received, the items are further narrowed down using the camera ID.

When a corresponding item is found in the connection permission list 411, it is determined that the connection succeeds, and when the corresponding item is not found, it is determined that the connection fails. When a plurality of corresponding items are found in the connection permission list 411, the connection is regarded as being unsuccessful, since the remote camera 10 to be connected cannot be identified. When another user terminal is connected to the corresponding remote camera 10, the connection is also regarded as being unsuccessful. However, when the remote camera 10 supports simultaneous photography for a plurality of users, the connection may also be regarded as being successful.

A result of the connection determination in step S803 is reported to the user terminal 20 (step S804) and is also used for a determination (step S805) as to whether or not the authentication photography processing is to be started. In this case, only when the connection has succeeded, the camera management server 30 issues an authentication-photography start request to the remote camera 10 (step S806).

The user terminal 20 selects a subsequent process in accordance with the connection determination result from the camera management server 30 (step S807). If the connection has succeeded, the authentication photography processing is started, and if the connection has failed, the remote-camera operation application 710 is quit (step S829).

The above description has been given of the startup processing in the remote photography system 1.

<1-2-2. Authentication Photography Processing>

Next, a description will be given of the authentication photography processing in the remote photography system 1.

Upon receiving the authentication-photography start request from the camera management server 30, the remote camera 10 starts up the authentication application 610 and enters a state in which it can receive a photography instruction from the user terminal 20 (step S808).

Figure 10A:
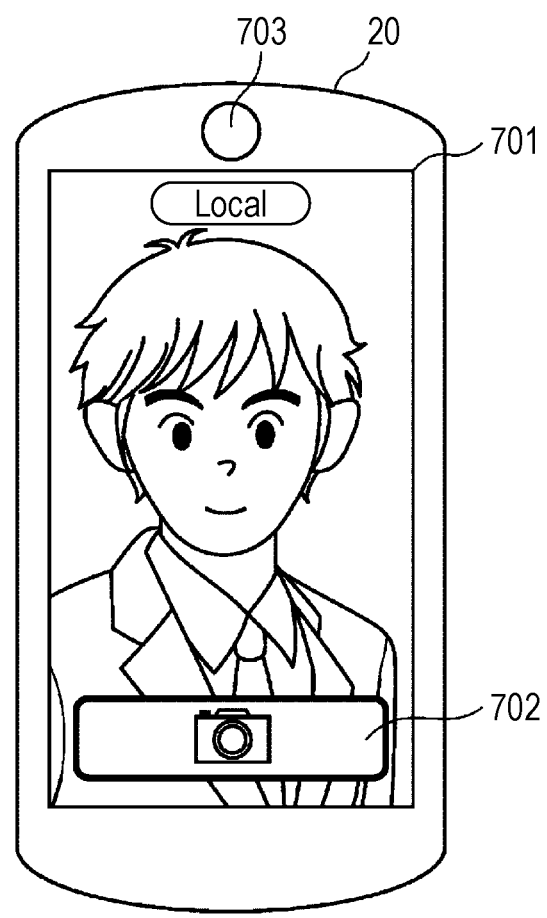
FIG. 10A illustrates one example of an authentication photography preview.

The user terminal 20 starts authentication photography preview (step S809). The authentication photography preview is operated by the local photography module 721 in the remote-camera operation application 710. In the authentication photography preview, the user terminal 20 waits for the user's photography instruction input from the photography-instruction input unit 702 while repeating generation of preview image data obtained in photography by using the photography control function 712 and display of a preview image on the display unit 701 by using the image display function 715. A preview image is displayed on the display unit 701 in the user terminal 20, for example, as illustrated in FIG. 10A.

The user views the display unit 701, confirms that his or her face is shown, and touches the photography-instruction input unit 702 to input a photography instruction (step S810).

When the photography instruction is input from the user, the photography control function 712 of the user terminal 20 actuates the terminal camera 703 to generate terminal image data 612 used for the authentication (step S813) and transmits the terminal image data 612 to the remote camera 10 via the camera management server 30 (step S814).

Also, when the photography instruction is input from the user, the remote operation function 714 of the user terminal 20 transmits the photography instruction to the remote camera 10 via the camera management server 30 (step S811).

Figure 10B:
FIG. 10B illustrates example of an image acquired by the remote camera.

Upon receiving the photography instruction from the user terminal 20, the photography control function 613 of the remote camera 10 actuates the photographic camera 601 to generate remote image data 611 used for the authentication (step S812). FIG. 10B illustrates one example of the remote image data 611 generated in step S812.

The generated remote image data 611 is temporarily stored in the storage unit 603. The terminal image data 612 received from the user terminal 20 is also temporarily stored in the storage unit 603.

In order to authenticate that the user terminal 20 is present in a corresponding photography spot, the time lag between step S812 and step S813 is preferably a few minutes or less and is more preferably a few seconds or less. In the remote photography system 1, the time lag between step S812 and step S813 is, for example, 5 seconds or less. The difference between the time at which the remote image data obtained in step S812 was acquired and the time at which the terminal image data obtained in step S813 was acquired is smaller than or equal to the aforementioned time lag. Photography performed by both the remote camera 10 and the user terminal 20 so that the difference between the time of remote image data acquisition performed by the remote camera 10 and the time of terminal image data acquisition performed by the user terminal 20 is smaller than or equal to the time lag is referred to as "photography performed by the remote camera 10 and the user terminal 20 in the same time segment". Thus, the photography instruction transmitted to the remote camera 10 via the camera management server 30 in step S811 is for the same time segment.

The above description has been given of the authentication photography processing in the remote photography system 1.

<1-2-3. User Authentication Processing>

Next, a description will be given of the user authentication processing in the remote photography system 1.

The authentication application 610 in the remote camera 10 performs image comparison processing for comparing the remote image data 611 and the terminal image data 612 with each other, the image data 611 and 612 being temporarily stored in the storage unit 603 (step S815). The image comparison processing includes a feature extraction step of extracting, by the image-feature extraction module 620, pieces of feature data from the remote image data 611 and the terminal image data 612 and a feature comparison step of comparing, by the feature comparison module 621, the extracted pieces of feature data with each other.

In the remote photography system 1, for example, comparison based on facial-feature data is performed. In the feature extraction step, for example, areas that can be determined to be faces are detected from the two pieces of image data 611 and 612, and pieces of facial-feature data are extracted from the respectively detected face areas. Then, in the feature comparison step, comparison is performed based on the pieces of facial-feature data extracted from the respective pieces of image data. When an identical person (i.e. an identical subject) is captured in both the remote image data 611 and the terminal image data 612, this means that the pieces of facial-feature data match each other. This makes it possible to confirm that the user who is operating the user terminal 20 is in the photography range of the remote camera 10.

The authentication application 610 in the remote camera 10 uses the authentication determination module 622 to perform authentication determination processing for determining whether or not the authentication succeeds or fails, depending on whether or not the pieces of facial-feature data match each other (step S816). The authentication determination module 622 regards the pieces of facial-feature data as matching each other, for example, when the difference (distance) between the pieces of feature data is smaller than a threshold.

There is a possibility that not only the user of the user terminal 20 but also another person is captured in the remote image data 611 and the terminal image data 612. Accordingly, in the remote photography system 1, comparison is performed on combinations of all faces captured in the remote image data 611 and the terminal image data 612, and when any of the facial-feature data match other facial-feature data, it is determined that the authentication succeeds.

The remote camera 10 transmits the authentication result to the user terminal 20 via the camera management server 30 (step S817). Thereafter, the remote camera 10 closes the authentication application 610 (step S820), and the process proceeds to the remote photography processing.

When the authentication succeeds, authority to operate the remote camera 10 is given to the user terminal 20, simultaneously with the transmission of the authentication result. The remote image data 611 and the terminal image data 612 that were used for the authentication processing become unnecessary at this point in time, and are thus deleted from the storage unit 603.

Upon receiving the authentication result from the remote camera 10, the user terminal 20 checks whether or not the authentication has succeeded (step S818). If the authentication has succeeded, the process proceeds to the remote photography processing.

If the authentication has failed, the authentication can be performed again, and when a re-authentication instruction is input from the user, the process returns to step S809, and the authentication photography is performed again (step S819).

Some causes are conceivable for the failure in the authentication. Examples include a case in which the user's face does not face the remote camera 10 and a case in which the user wears sunglasses or the like and thus facial-feature data cannot be extracted. In such cases, the authentication can be performed again after the photography is performed again so as to satisfy conditions. Also, when an input indicating that the user gives up the authentication is received from the user, the process proceeds to step S829 in which the remote-camera operation application 710 is quit.

Since a large number of related techniques, including the technique employed in Japanese Unexamined Patent Application Publication No. 2014-99763, have been disclosed for an algorithm for detecting the face of a person from image data and extracting feature data of the face and an algorithm for comparing feature data of a plurality of faces, detailed descriptions thereof are not given herein. An algorithm to be employed is not limited to a particular algorithm and may be any algorithm that meets the effect of the present disclosure.

The above description has been given of the user authentication processing in the remote photography system 1.

<1-2-4. Remote Photography Processing>

Next, a description will be given of the remote photography processing in the remote photography system 1.

First, the remote camera 10 and the user terminal 20 start remote photography preview.

In the remote photography preview, the remote camera 10 generates preview image data, corresponding to second remote image data, by using the photography control function 613 (step S821), transmits the preview image data to the user terminal 20 by using the image transmitting and receiving function 614 (step S822), and also enters a state in which the remote camera 10 can receive a photography instruction from the user terminal 20.

It is desirable that the preview image data be shown in the form of a moving image, not a still image, in order for the user to use it to check a photography position and so on. An image size and a transfer rate are also selected in accordance with the transfer rate of the network. The preview image data, however, may be any of a moving image and a still image, and the image size and transfer rate of the preview image data are not particularly limiting.

Figure 10C:
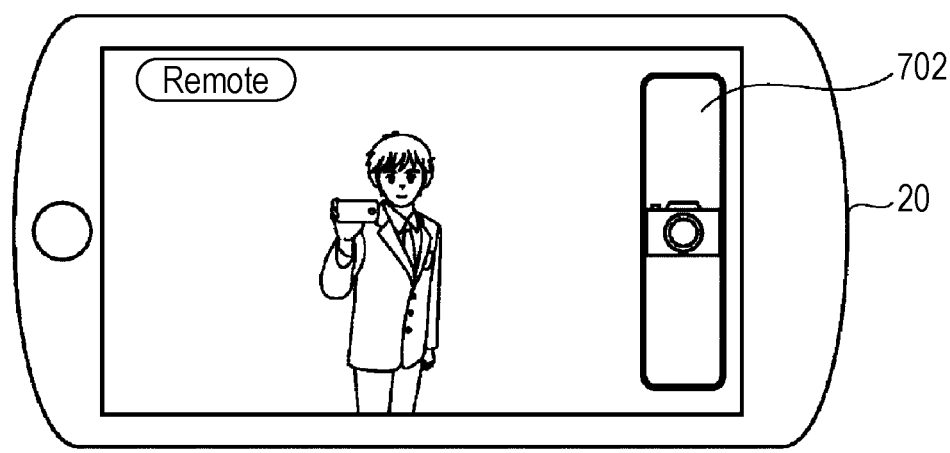
FIG. 10C illustrates one example of a remote photography preview.

In the remote photography preview, the user terminal 20 receives the preview image data from the remote camera 10 by using the image transmitting and receiving function 713 and displays the received preview image data on the display unit 701 by using the image display function 715 (step S823). For example, as illustrated in FIG. 10C, a preview image is displayed on the display unit 701 of the user terminal 20.

Thus, the user can change the composition, that is, change the pose of a subject and the position where the subject stands, while viewing the preview image. When the composition is determined, the user touches the photography-instruction input unit 702 to input a photography instruction for remote photography (step S824). Through such an operation, the user can operate the installed remote camera 10 by using the user terminal 20, as if the remote camera 10 were his or her own camera. When the photography instruction is input from the user, the remote photography module 722 in the remote-camera operation application 710 transmits the photography instruction to the remote camera 10 via the camera management server 30 (step S825).

Upon receiving the photography instruction, the remote camera 10 generates remote image data 711 by using the photography control function 712 (step S826). The image transmitting and receiving function 614 then transmits the generated remote image data 711 to the user terminal 20 via the camera management server 30 (step S827).

The remote photography module 722 in the user terminal 20 records the remote image data 711, received from the remote camera 10, to the storage unit 705 (step S828). The remote photography module 722 in the user terminal 20 may also display the remote image data 711, received from the remote camera 10, on the display unit 701 by using the image display function 715.

Thereafter, the user terminal 20 closes the remote-camera operation application 710 (step S829).

The above description has been given of the remote photography processing in the remote photography system 1.

<1-3. Brief Conclusion>

According to the remote photography system 1, only when the user having the user terminal 20 is present in the photography spot of the remote camera 10, authority to operate the remote camera 10 is given to the user terminal 20. This allows the user who is present in the photography spot to perform photography using the remote camera 10, and can also prevent a user who is not present in the photography spot from remotely operating the remote camera 10.

2. Second Embodiment

Next, a description will be given of a remote photography system 2 according to a second embodiment.

<2-1. Differences from Remote Photography System 1>

First, a brief description will be given of differences between the remote photography system 2 according to the second embodiment and the remote photography system 1 according to the first embodiment.

The remote photography system 2 does not include the camera management server 30. In the remote photography system 2, the remote camera 10 executes the processing that the camera management server 30 executes in the remote photography system 1.

In the remote photography system 1 described above, the subject (target) in the authentication photography processing is the user's face. In the remote photography system 2, the remote camera 10 designates a target in the authentication photography processing. Information indicating the designated target is transmitted from the remote camera 10 to the user terminal 20, and is displayed on the display unit 701 of the user terminal 20 during authentication photography preview.

In the remote photography system 1, the image feature comparison is to compare feature data of a person's face. In the remote photography system 2, the image feature comparison is to compare feature data of the appearance (clothing) of a person. Namely, in the remote photography system 2, the subject (target) in the authentication photography processing is the appearance of the person.

The configuration and the operation of the remote photography system 2 having the above-described features will be described with reference to the accompanying drawings. Elements that are the same as or similar to those in the remote photography system 1 are not described hereinafter.

<2-2. Configuration>

Figure 11:
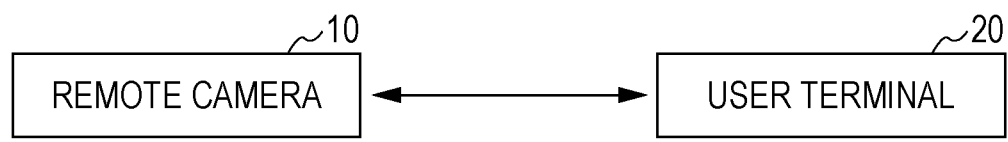
FIG. 11 is a block diagram illustrating the configuration of a remote photography system.

As illustrated in FIG. 11, the remote photography system 2 includes at least one remote camera 10 and at least one user terminal 20. One remote camera 10 and one user terminal 20 communicate with each other through a mobile-phone communication network or another network.

<2-2-1. Remote Camera 10>

Figure 12A:
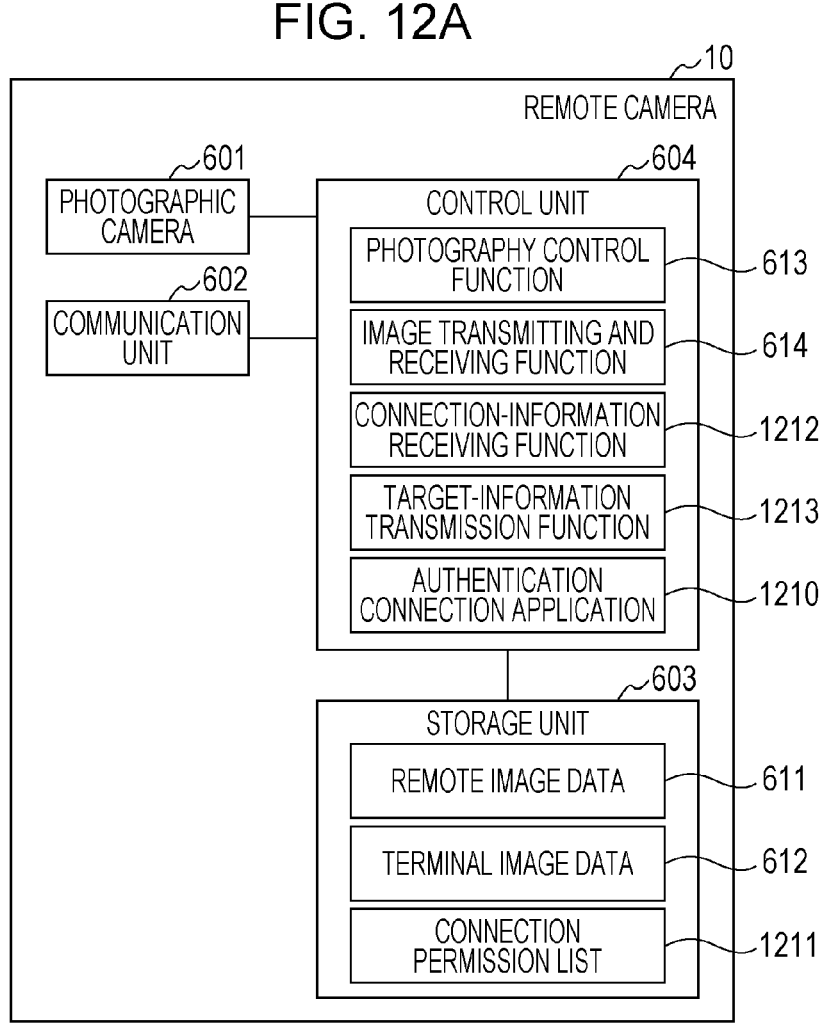
FIG. 12A is a block diagram illustrating an example of the functional configuration of a remote camera.

FIG. 12A is a block diagram illustrating an example of the functional configuration of each remote camera 10 in the remote photography system 2. As illustrated in FIG. 12A, the storage unit 603 holds a connection permission list 1211 in addition to the configuration of the remote photography system 1. The control unit 604 has a connection-information receiving function 1212 and a target-information transmission function 1213 as main functions, in addition to the configuration of the remote photography system 1. In addition, an authentication connection application 1210 is pre-installed in the remote camera 10 and operates as a function of the control unit 604.

(Connection-Information Receiving Function 1212)

The connection-information receiving function 1212 is, for example, a function for obtaining the ID information of the user terminal 20, in order for the authentication connection application 1210 to control whether or not a connection with the user terminal 20 can be established.

(Target-Information Transmission Function 1213)

The target-information transmission function 1213 is a function for transmitting, to the user terminal 20, target information indicating a target (subject) of the authentication photography, when preview image data is transmitted from the remote camera 10 to the user terminal 20 during authentication photography. The target information is, for example, information about a position (coordinates) and a size in a preview image.

(Authentication Connection Application 1210)

Figure 12B:
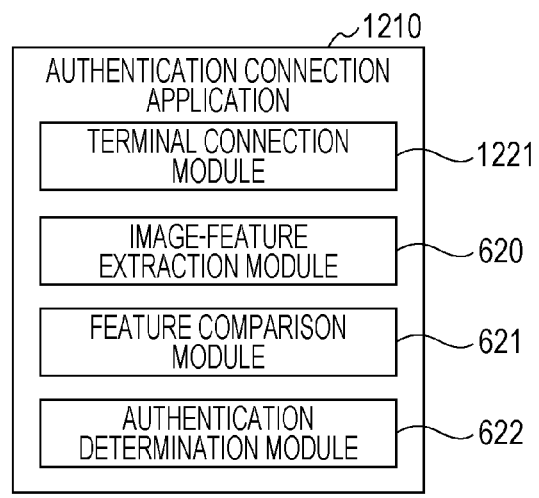
FIG. 12B is a block diagram illustrating an example of the data configuration of an authentication connection application.

The authentication connection application 1210 is a program pre-installed in the remote camera 10, as described above. The authentication connection application 1210 includes a terminal connection module 1221, as illustrated in FIG. 12B. By using the connection-information receiving function 1212 of the control unit 604 and on the basis of the connection permission list 1211, the terminal connection module 1221 controls access of the user terminal 20 which is to use the remote photography system 2.

(Connection Permission List 1211)

Now, a description will be given of the connection permission list 1211. FIG. 13 is a table illustrating one example of the connection permission list 1211.

In the illustrated example, the connection permission list 1211 is a list in which two kinds of information, that is, user IDs for identifying the user terminals 20 and connection conditions indicating when the remote photography system 2 can be used, are associated with each other.

In FIG. 13, the connection condition for the user terminal 20 having a user ID "TID01" is indicated by "−". This means that the user terminal 20 having the user ID "TID01" can connect to the remote camera 10 regardless of the date and time.

The connection condition for the user terminal 20 having a user ID "TID04" shows "11/02/15:00-11/02/15:10" and "11/03/15:00-11/03/16:00". This means that the user terminal 20 having the user ID "TID04" can connect to the remote camera 10 in the period of 15:00 to 15:10 on November 2 and in the period of 15:00 to 16:00 on November 3.

If the user terminal 20 attempts to connect to the remote camera 10 at date and time and with a user ID, the date and time and the user ID not being shown in the connection permission list 1211, the terminal connection module 1221 does not permit the connection. Accordingly, in such a case, the user terminal 20 cannot perform user authentication with the remote camera 10.

The methods for implementing and creating the connection permission list 1211 are analogous to those for the connection permission list 411 in the remote photography system 1 and are not particularly limiting. The user IDs are also analogous to those in the remote photography system 1.

<2-2-2. User Terminal 20>

Figure 14A:
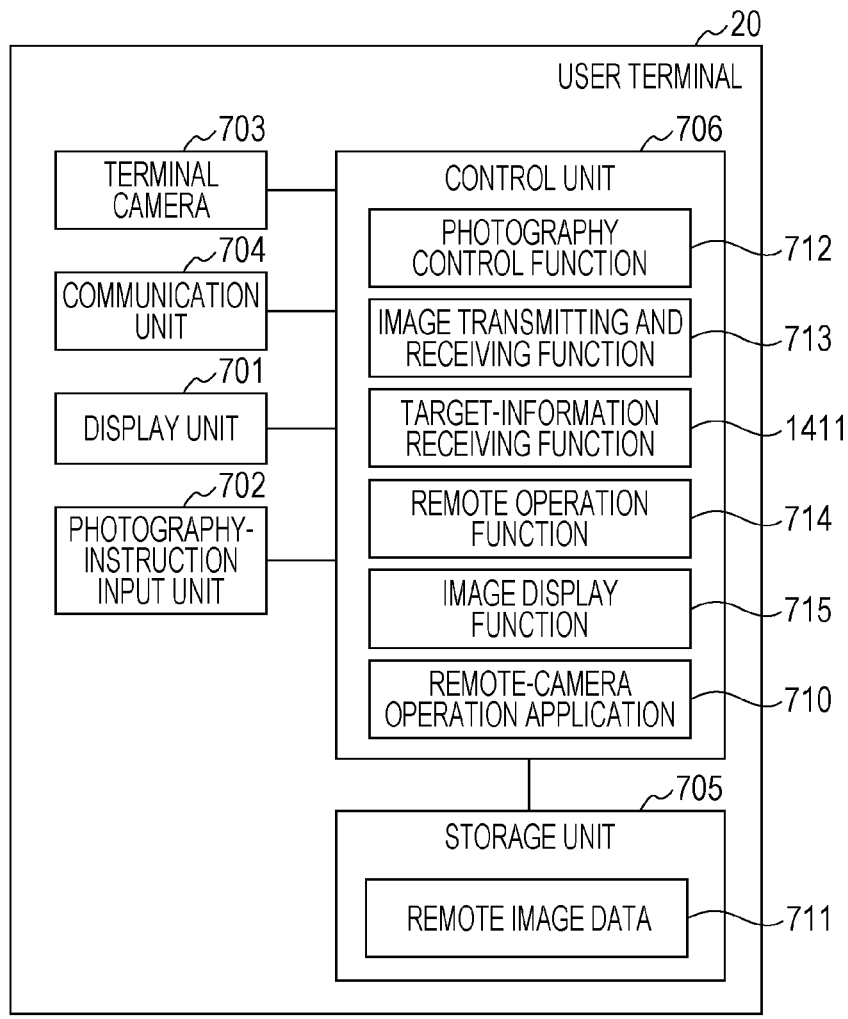
FIG. 14A is block diagram illustrating an example of the functional configuration of a user terminal.
Figure 14B:
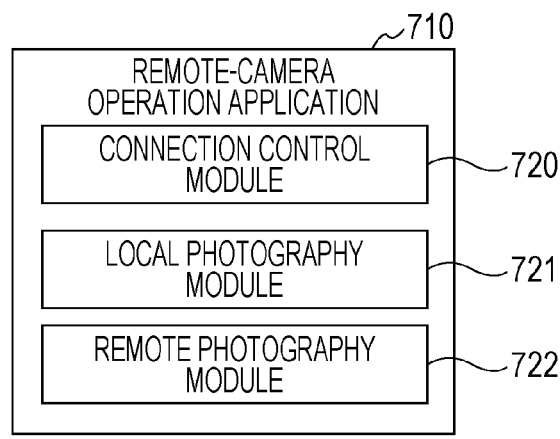
FIG. 14B is a block diagram illustrating an example of the data configuration of the remote-camera operation application.

FIG. 14A is a block diagram illustrating an example of the functional configuration of each user terminal 20 in the remote photography system 2. As illustrated in FIG. 14A, the control unit 706 has a target-information receiving function 1411 as a main function, in addition to the configuration of the remote photography system 1.

(Target-Information Receiving Function 1411)

The target-information receiving function 1411 is a function for receiving, from the remote camera 10, target information indicating a target (subject) of the authentication photography, when the remote camera 10 transmits a preview image to the user terminal 20 during the authentication photography. As described above, the target information is, for example, information about a position (coordinates) and a size in a preview image.

<2-3. Operation>

The operation of the remote photography system 2 will be described below with reference to FIGS. 15A, 15B, 16, and 17A to 17C.

Similarly to the remote photography system 1, the operation of the remote photography system 2 can be broadly classified into startup processing, authentication photography processing, user authentication processing, and remote photography processing.

The processing will be described below in sequence with reference to FIGS. 15A and 15B. Since the remote photography processing involves processing that is similar to that in the remote photography system 1, except that mediation of the camera management server 30 is not involved.

<2-3-1. Startup Processing>

A description will be given of the startup processing in the remote photography system 2.

First, the remote camera 10 starts up the authentication connection application 1210 (step S1500). Since the remote camera 10 needs to be ready for a connection start request from each user terminal 20 any time, the authentication connection application 1210 is started up during startup of the remote camera 10.

Figure 16:
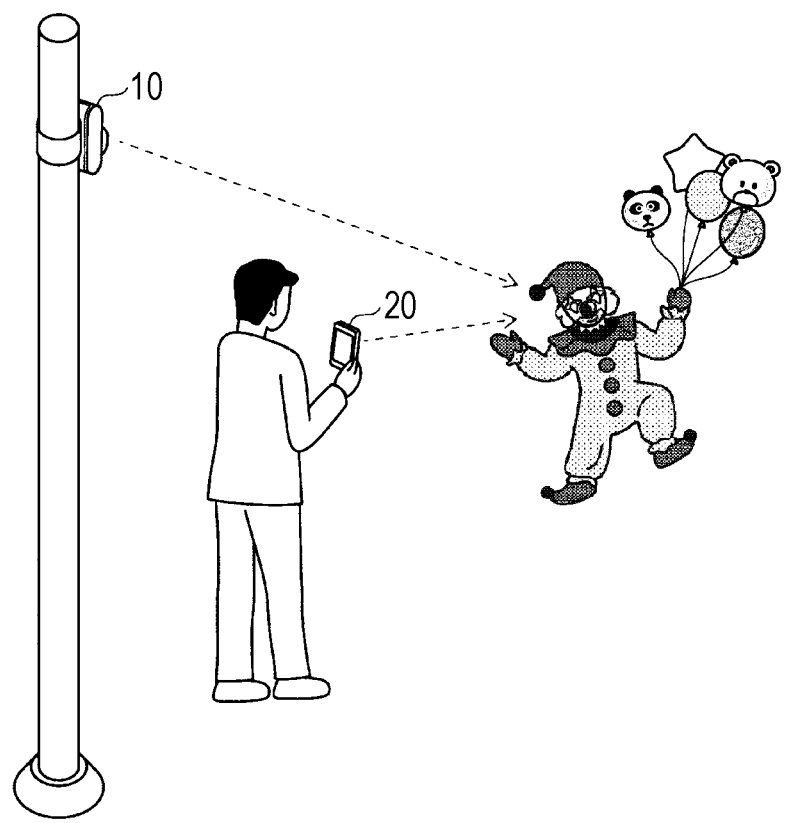
FIG. 16 illustrates a user's action in the remote photography system.

Upon arriving at a photography spot, the user confirms that he or she is at a position where he or she can see the photography range of the remote camera 10, as illustrated in FIG. 16, and operates the user terminal 20 to start up the pre-installed remote-camera operation application 710 (step S1501).

When the remote-camera operation application 710 is started up, first, the connection control module 720 operates to execute connection processing for connecting to the remote camera 10 (step S1502). In the connection processing, the connection control module 720 transmits the user ID of the user terminal 20, together with a connection start request, to the remote camera 10.

When the remote camera 10 receives the connection start request from the user terminal 20, the terminal connection module 1221 in the authentication connection application 1210 performs connection determination processing by using the received user ID of the user terminal 20 (step S1503).

A result of the connection determination in step S1503 is reported to the user terminal 20 (step S1504) and is also used for a determination (step S1505) as to whether or not the authentication photography processing is to be started.

The user terminal 20 selects a subsequent process in accordance with the connection determination result from the remote camera 10 (step S1506). If the connection has succeeded, the authentication photography processing is started, and if the connection has failed, the remote-camera operation application 710 is quit (step S1529).

The above description has been given of the startup processing in the remote photography system 2.

<2-3-2. Authentication Photography Processing>

Next, a description will be given of the authentication photography processing in the remote photography system 2.

First, the remote camera 10 generates remote image data 611 by using the photography control function 613 (step S1507) and temporarily stores the remote image data 611 in the storage unit 603.

Next, the remote camera 10 performs target designation processing using the authentication connection application 1210 (step S1508). In the target designation processing, for example, the image-feature extraction module 620 in the authentication connection application 1210 detects an area of a person and the appearance (clothing) of the person from the remote image data 611 and extracts feature data about the color of the clothing and so on. Based on the extracted feature data, the feature comparison module 621 identifies a target that can be easily distinguished from another subject. For example, when a plurality of people are detected, pieces of feature data of the people are compared with each other, and a person having a largest difference in the feature data from that of the others is designated as a target. The feature comparison module 621 then generates, as target information, information (e.g., position information and size information) indicating the area of the designated target in the remote image data 611. In the remote photography system 2, a target is designated each time the authentication photography is executed. Thus, in the remote photography system 2, the target changes each time the authentication photography is executed.

The remote camera 10 transmits the remote image data 611 and the target information to the user terminal 20 by using the image transmitting and receiving function 614 and the target-information transmission function 1213 (step S1509).

In the authentication photography processing, the user terminal 20 starts authentication photography preview using the local photography module 721 in the remote-camera operation application 710 (step S1510).

Figure 17A:
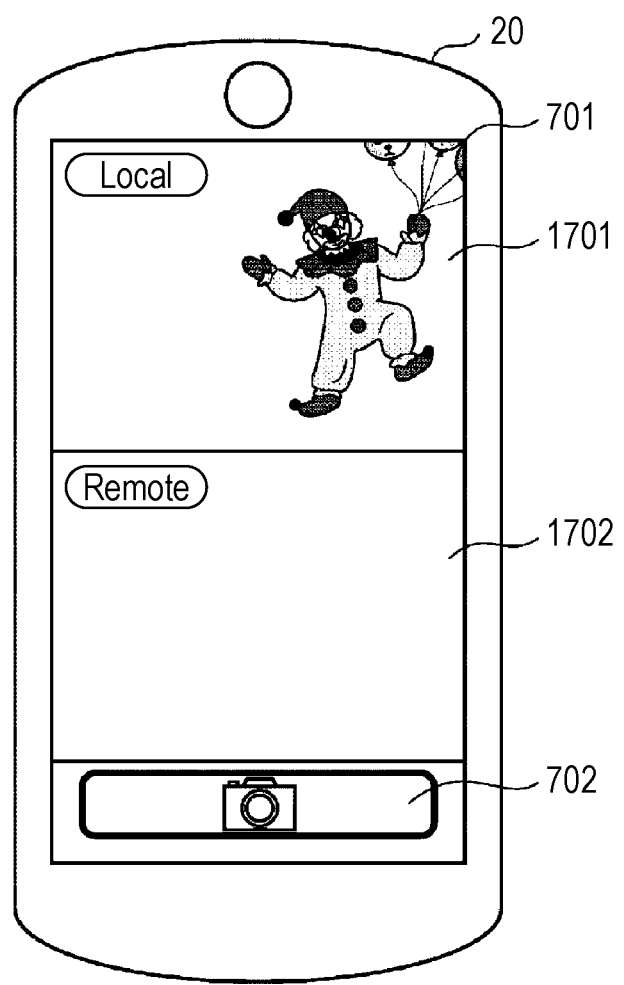
FIG. 17A illustrates an example of what is displayed during startup of the remote-camera operation application.
Figure 17B:
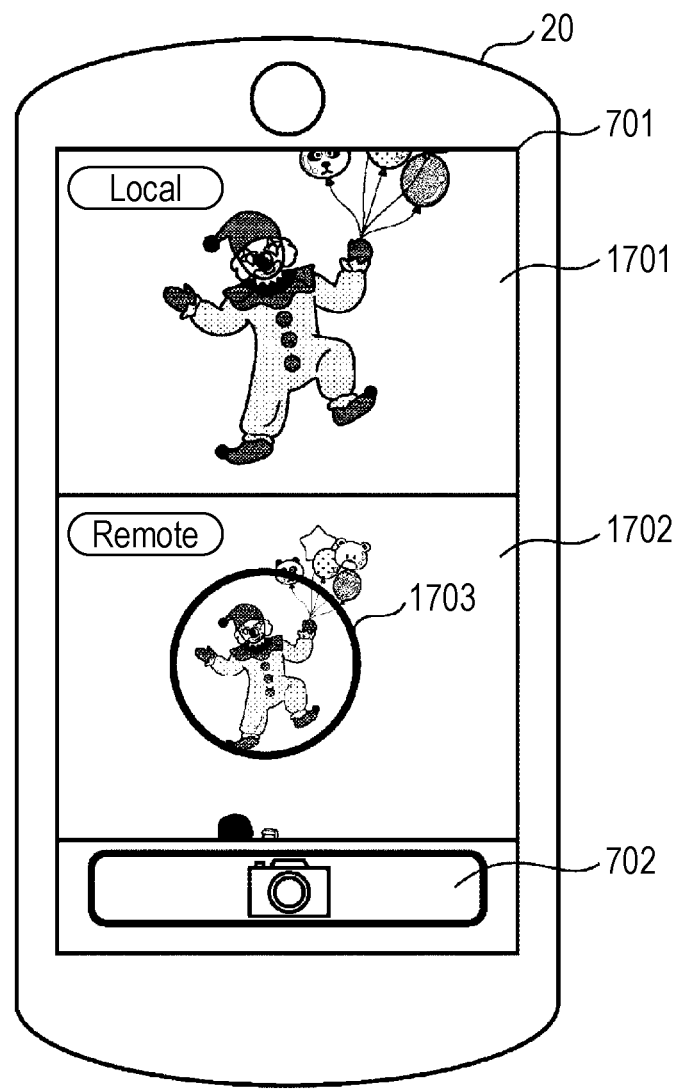
FIG. 17B illustrates one example of an authentication photography preview.
Figure 17C:
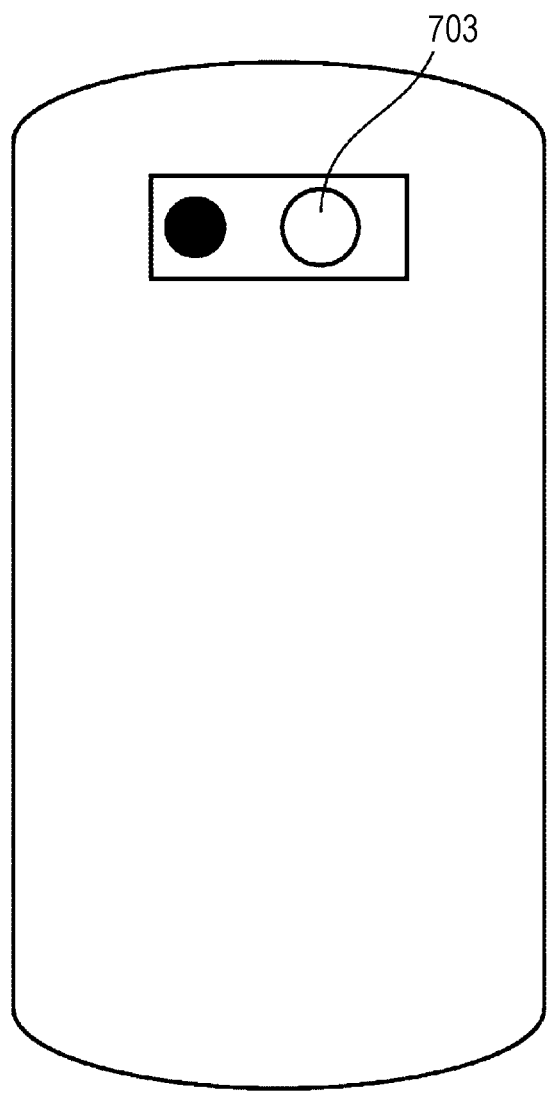
FIG. 17C illustrates an example of the configuration of the back surface of the user terminal.

In the authentication photography preview, the local photography module 721 repeats generation of preview image data obtained in photography using the photography control function 712 and display of a preview image on the display unit 701 by using the image display function 715. As a result, the preview image data acquired by the terminal camera 703 is displayed in a local image display area 1701 on the display unit 701, as illustrated in FIGS. 17A and 17B. In the remote photography system 2, the terminal camera 703 is provided on the back surface (the surface at the reverse side of the display unit 701) of the user terminal 20, as illustrated in FIG. 17C.

Also, the user terminal 20 displays the remote image data and the target information received from the remote camera 10, in parallel with the authentication photography preview (step S1511). The user terminal 20 receives the remote image data and the target information from the remote camera 10 by using the image transmitting and receiving function 713 and the target-information receiving function 1411 and displays the received remote image data and target information on the display unit 701 by using the image display function 715. When the user terminal 20 and the remote camera 10 are properly connected to each other, the remote image data received from the remote camera 10 is displayed in a remote image display area 1702 on the display unit 701, as illustrated in FIG. 17B. A circle (○) 1703 in FIG. 17B is a pointer indicating a target and is displayed superimposed on the remote image data at the position indicated by the target information and with the size indicated by the target information.

The user views the display unit 701 to confirm that the target designated by the circle (○) 1703 in the remote image display area 1702 is shown in the local image display area 1701, as illustrated in FIG. 17B, and touches the photography-instruction input unit 702 to input a photography instruction (step S1512).

When the photography instruction is input from the user, the photography control function 712 of the user terminal 20 actuates the terminal camera 703 to generate terminal image data 612 used for authentication (step S1513) and transmits the terminal image data 612 to the remote camera 10 (step S1514).

The remote camera 10 temporarily stores, in the storage unit 603, the terminal image data 612 received from the user terminal 20.

The above description has been given of the authentication photography processing in the remote photography system 2.

<2-3-3. User Authentication Processing>

Next, a description will be given of the user authentication processing in the remote photography system 2.

The authentication connection application 1210 in the remote camera 10 performs image comparison processing for comparing the terminal image data 612 and the remote image data 611 with each other, the image data 612 and 611 being temporarily stored in the storage unit 603 (step S1515). The image comparison processing includes a feature extraction step of extracting, by the image-feature extraction module 620, pieces of feature data from the remote image data 611 and the terminal image data 612 and a feature comparison step of comparing, by the feature comparison module 621, the extracted pieces of feature data with each other.

The remote photography system 2 performs comparison based on, for example, feature data of the appearance (clothing) of a person. In the feature extraction step, for example, a scheme that is the same as or similar to that for the above-described target designation processing is used to extract feature data from the terminal image data 612. In the feature comparison step, the feature data of the target extracted in the above-described target designation processing and the feature data extracted from the terminal image data 612 are compared with each other.

Depending on whether or not the feature data match each other, the authentication determination module 622 in the authentication connection application 1210 in the remote camera 10 determines whether or not authentication succeeds or fails (step S1516).

The remote camera 10 transmits the authentication result to the user terminal 20 (step S1517).

The remote camera 10 selects a subsequent process, depending on whether or not the authentication has succeeded or failed (step S1518), and if the authentication has succeeded, the process proceeds to the remote photography processing. If the authentication has failed, the process returns to step S1507, and the authentication photography processing is performed again. The remote image data 611 and the terminal image data 612 that were used for the authentication processing become unnecessary at this point in time and are thus deleted from the storage unit 603.

Upon receiving the authentication result from the remote camera 10, the user terminal 20 checks whether or not the authentication has succeeded (step S1519). If the authentication has succeeded, the process proceeds to the remote photography processing.

If the authentication has failed, the authentication can be performed again, and when a re-authentication instruction is input from the user, the process returns to step S1509, and the authentication photography processing is performed again (step S1520). If an input indicating that the user gives up the authentication is received from the user, the process proceeds to step S1529 in which the remote-camera operation application 710 is quit.

Since a large number of related techniques have been disclosed for an algorithm for detecting the area of a person and the person's clothing from an acquired image and an algorithm for performing comparison on the basis of the shape and color of clothing, detailed descriptions thereof are not given hereinafter. An algorithm to be employed is not limited to a particular algorithm and may be any algorithm that meets the effect of the present disclosure.

The above description has been given of the user authentication processing in the remote photography system 2.

<2-4. Brief Conclusion>

According to the remote photography system 2, only when the user having the user terminal 20 is present in the photography spot of the remote camera 10, authority to operate the remote camera 10 is given to the user terminal 20. This allows the user who is present in the photography spot to perform photography using the remote camera 10, and can also prevent a user who is not present in the photography spot from remotely operating the remote camera 10.

3. Third Embodiment

A remote photography system 3 according to a third embodiment will be described below.

<3-1. Differences from Remote Photography System 1>

First, a brief description will be given of differences between the remote photography system 3 according to the third embodiment and the remote photography system 1 according to the first embodiment.

In the remote photography system 1 described above, the photography instruction in the authentication photography processing is transmitted from the user terminal 20 to the remote camera 10 via the camera management server 30. In the remote photography system 3, photography instructions in the authentication photography processing are transmitted from the camera management server 30 to the user terminal 20 and the remote camera 10.

In the remote photography system 1 described above, the remote camera 10 executes the image comparison processing and the user authentication processing. In the remote photography system 3, the camera management server 30 executes the image comparison processing and the user authentication processing.

In the remote photography system 1 described above, the image comparison processing is to compare feature data of a person's face. In the remote photography system 3, the image feature comparison is to compare feature data of a person's body movement (motion). Namely, in the remote photography system 3, the subject (target) in the authentication photography processing is the person's body movement.

The configuration and the operation of the remote photography system 3 having the above-described features will be described with reference to the accompanying drawings. Elements that are the same as or similar to those in the remote photography system 1 are not described hereinafter.

<3-2. Configuration>

Similarly to the remote photography system 1, the remote photography system 3 includes at least one remote camera 10, at least one user terminal 20, and a camera management server 30. Each user terminal 20 has a functional configuration that is the same as or similar to that in the remote photography system 1.

<3-2-1. Camera Management Server 30>

Figure 18A:
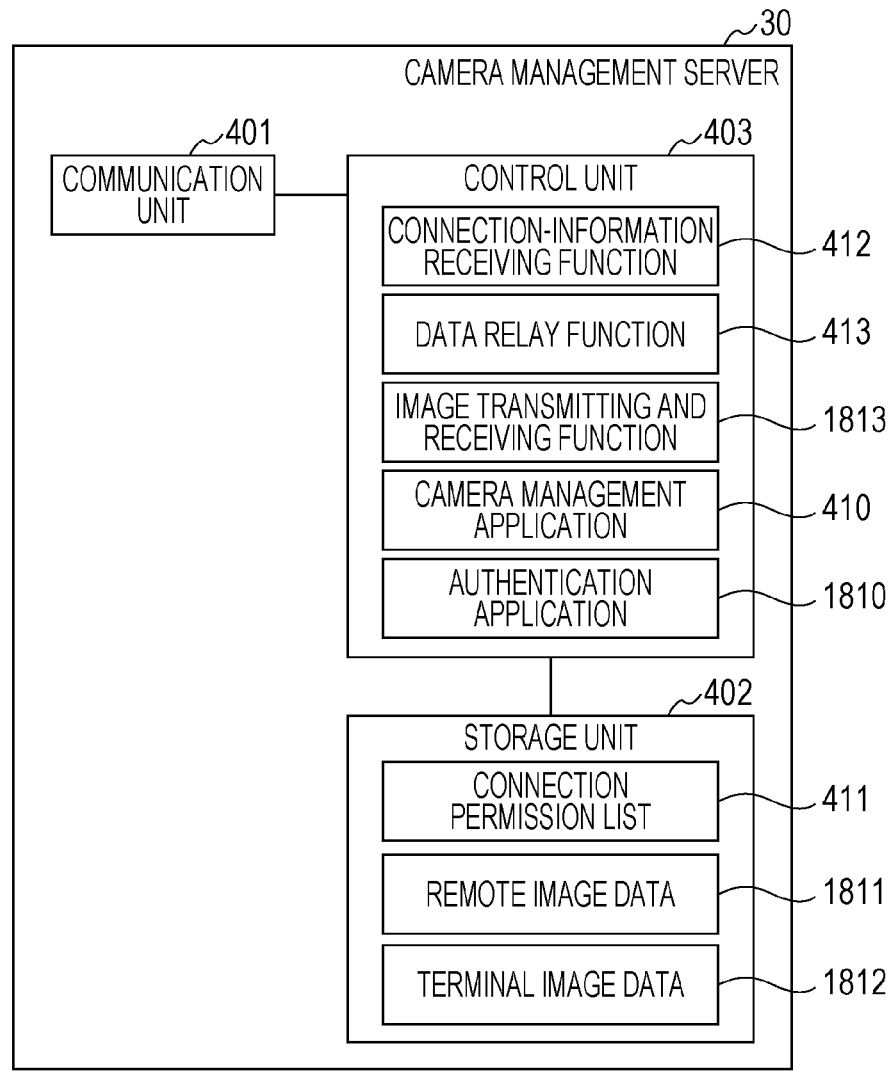
FIG. 18A is a block diagram illustrating an example of the functional configuration of a camera management server.
Figure 18B:
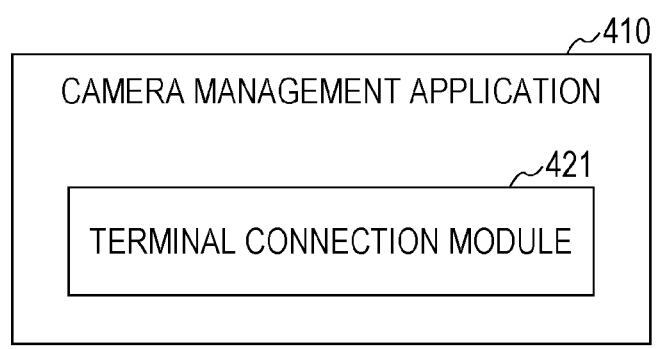
FIG. 18B is a block diagram illustrating an example of the data configuration of a camera management application.

FIG. 18A is a block diagram illustrating an example of the functional configuration of the camera management server 30 in the remote photography system 3. As illustrated in FIG. 18A, the storage unit 402 holds remote image data 1811 and terminal image data 1812 in addition to the configuration of the remote photography system 1. The control unit 403 has an image transmitting and receiving function 1813 as a main function, in addition to the configuration of the remote photography system 1. Additionally, an authentication application 1810 is pre-installed in the camera management server 30 and operates as a function of the control unit 403. The camera management application 410 includes a terminal connection module 421, as illustrated in FIG. 18B.

(Image Transmitting and Receiving Function 1813)

The image transmitting and receiving function 1813 is a function for controlling transmission/reception of image data to/from outside by using the communication unit 401. For example, the image transmitting and receiving function 1813 receives terminal image data for authentication processing from the user terminal 20 and receives remote image data from the remote camera 10.

(Authentication Application 1810)

Figure 18C:
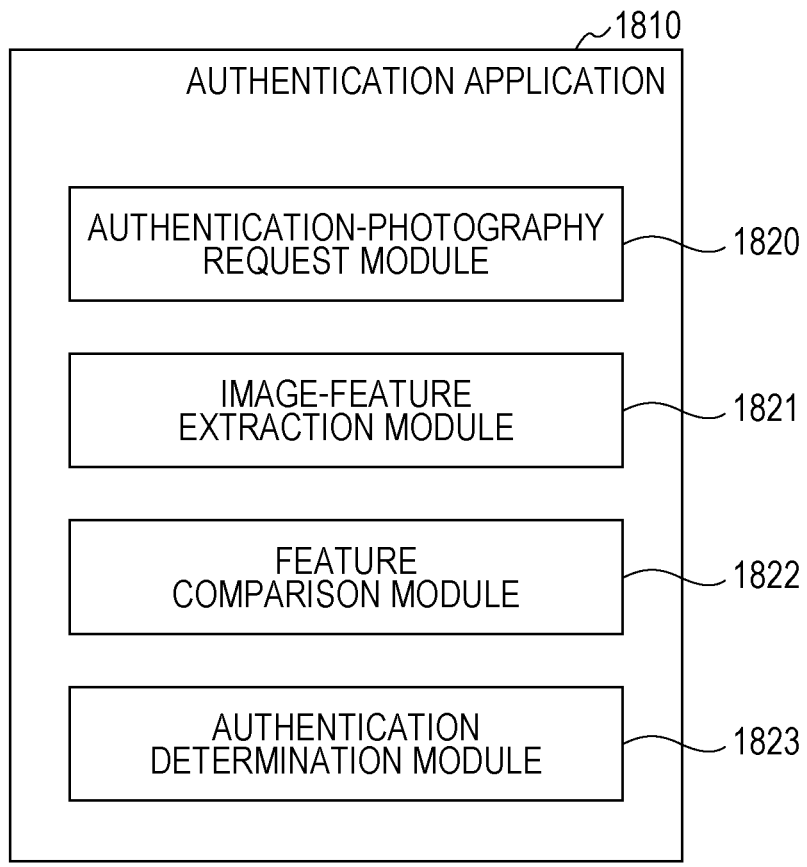
FIG. 18C is a block diagram illustrating an example of the data configuration of an authentication application.

The authentication application 1810 is a program pre-installed in the camera management server 30, as described above. As illustrated in FIG. 18C, the authentication application 1810 includes an authentication-photography request module 1820, an image-feature extraction module 1821, a feature comparison module 1822, and an authentication determination module 1823.

The authentication-photography request module 1820 transmits photography instructions to the remote camera 10 and the user terminal 20. The image-feature extraction module 1821 extracts pieces of feature data from the remote image data 1811 and the terminal image data 1812. The feature comparison module 1822 compares the extracted pieces of feature data with each other. Based on whether or not the two pieces of image data 1811 and 1812 have the same feature, the authentication determination module 1823 generates an authentication result indicating whether or not authentication has succeeded or failed.

<3-2-2. Remote Camera 10>

Figure 19:
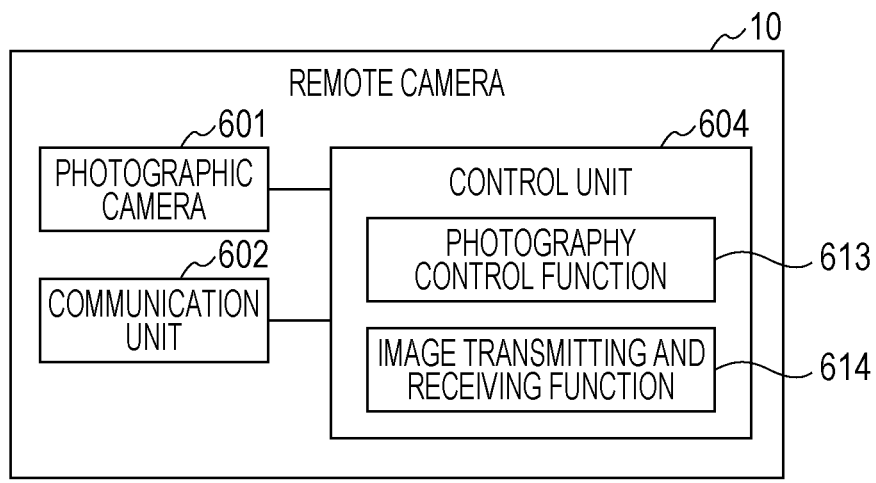
FIG. 19 is a block diagram illustrating an example of the functional configuration of a remote camera.

FIG. 19 is a block diagram illustrating an example of the functional configuration of each remote camera 10 in the remote photography system 3. As illustrated in FIG. 19, compared with the remote photography system 1, the storage unit 603 is not provided, and the authentication application 610 is not installed.

<3-3. Operation>

The operation of the remote photography system 3 will be described below with reference to FIGS. 20A, 20B, 21A, 21B, 22A, 22B, and 23.

Similarly to the remote photography system 1, the operation of the remote photography system 3 can be broadly classified into startup processing, authentication photography processing, user authentication processing, and remote photography processing.

Figure 20A:
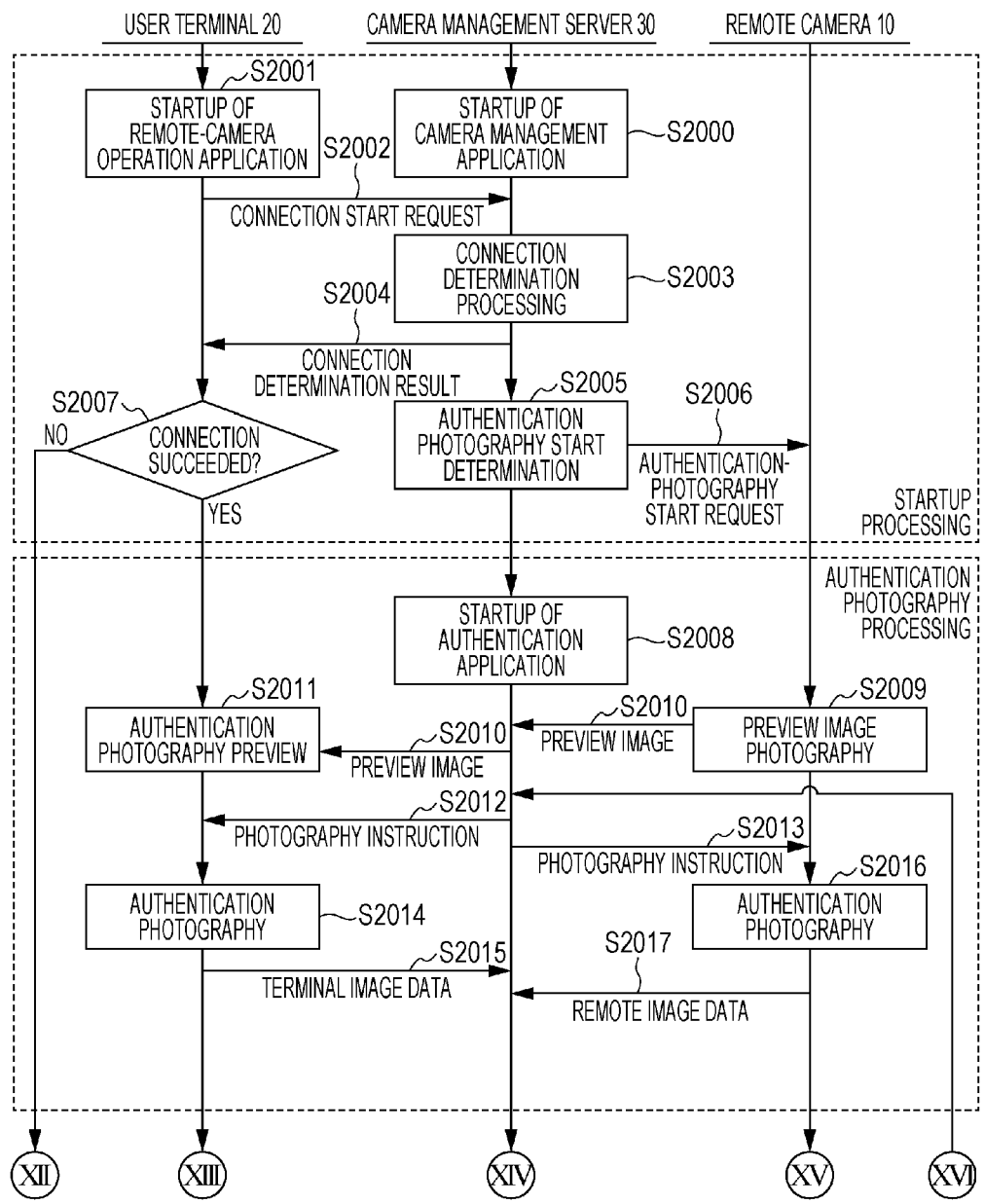

The processing will be described below in sequence with reference to FIGS. 20A and 20B. Since the startup processing and the remote photography processing involve processing that is the same as or similar to that in the remote photography system 1, descriptions thereof are not given hereinafter.

<3-3-1. Authentication Photography Processing>

A description will be given of the authentication photography processing in the remote photography system 3.

The remote camera 10 first generates preview image data by using the photography control function 613 (step S2009), transmits the preview image data to the user terminal 20 by using the image transmitting and receiving function 614 (step S2010), and waits for a photography instruction from the camera management server 30.

The user terminal 20 first starts authentication photography preview (step S2011) and waits for a photography instruction from the camera management server 30. The authentication photography preview can be divided into local preview operated by the local photography module 721 in the remote-camera operation application 710 and remote preview operated by the remote photography module 722.

Figure 21A:
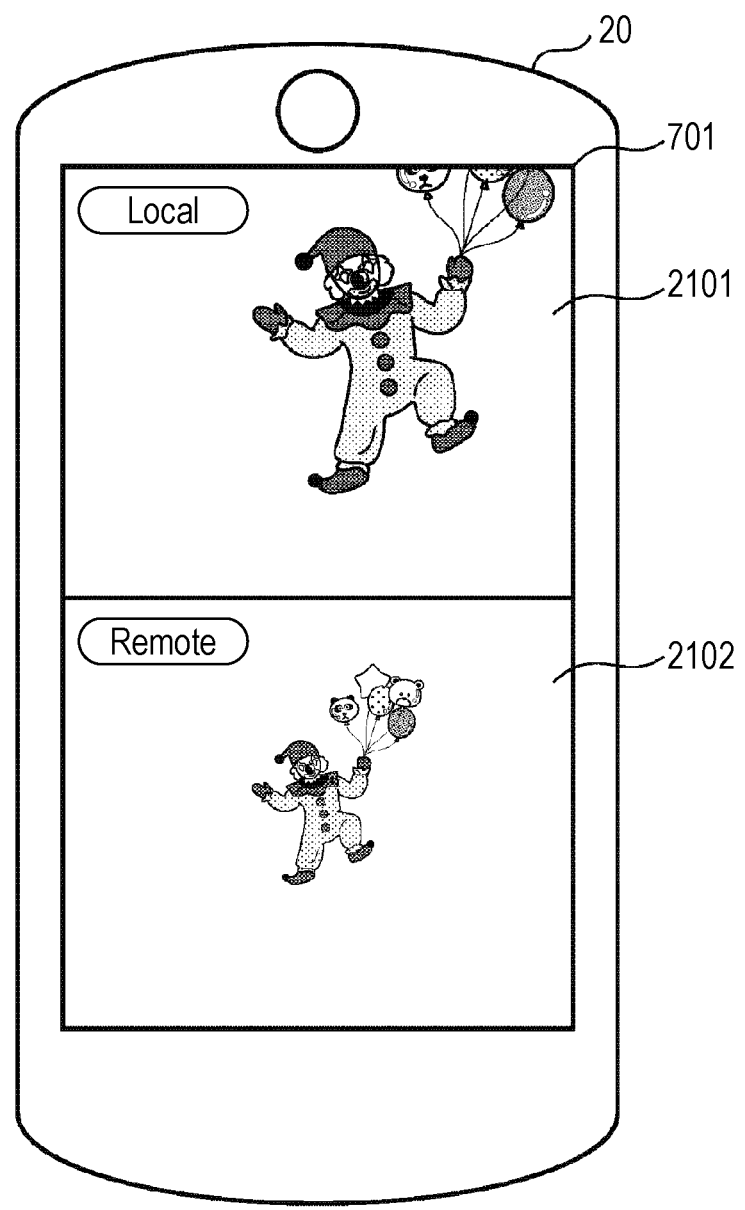
FIG. 21A illustrates an example of what is displayed during startup of the remote-camera operation application.

In the local preview, the local photography module 721 repeats generation of preview image data by using the photography control function 712 and display of a preview image on the display unit 701 by using the image display function 715. In the local preview, for example, as illustrated in FIG. 21A, a preview image is displayed in a local image display area 2101 on the display unit 701.

In the remote preview, the remote photography module 722 receives preview image data from the remote camera 10 by using the image transmitting and receiving function 713 and displays the received preview image data on the display unit 701 by using the image display function 715. In the remote preview, for example, as illustrated in FIG. 21A, a preview image is displayed in a remote image display area 2102 on the display unit 701.

Figure 21B:
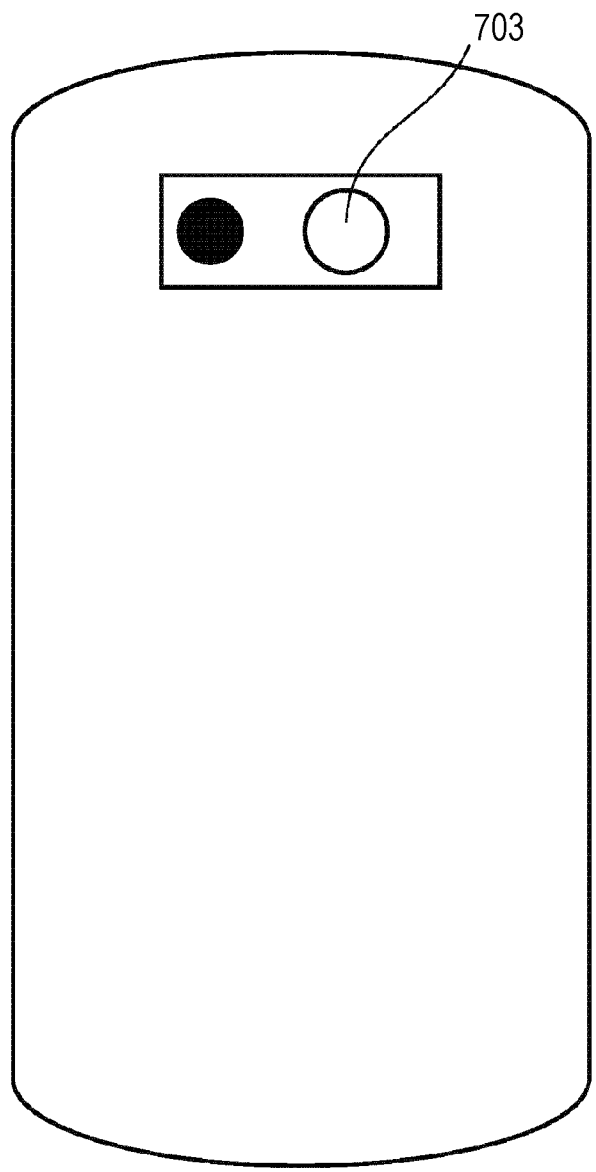
FIG. 21B illustrates an example of the configuration of the back surface of the user terminal.

The user views the two preview images on the display unit 701 and adjusts the orientation of the user terminal 20 so as to photograph the same target as that of the remote camera 10 in generally the same direction as that of the remote camera 10. As illustrated in FIG. 21B, in the remote photography system 3, the terminal camera 703 is provided on the back surface (the surface at the reverse side of the display unit 701) of the user terminal 20.

The camera management server 30 starts up the authentication application 1810 (step S2008) and transmits photography instructions to the user terminal 20 and the remote camera 10 (steps S2012 and S2013).

When the user terminal 20 receives the photography instruction, the photography control function 712 actuates the terminal camera 703 to generate terminal image data 1812 needed for authentication (step S2014) and transmits the terminal image data 1812 to the camera management server 30 (step S2015).

Similarly, when the remote camera 10 receives the photography instruction, the photography control function 613 actuates the photographic camera 601 to generate remote image data 1811 corresponding to first remote image data needed for the authentication (step S2016) and transmits the remote image data 1811 to the camera management server 30 (step S2017).

The image transmitting and receiving function 1813 in the camera management server 30 temporarily stores, in the storage unit 402, the remote image data 1811 received from the remote camera 10 and the terminal image data 1812 received from the user terminal 20.

The above description has been given of the authentication photography processing in the remote photography system 3.

<3-3-2. User Authentication Processing>

A description will be given of the user authentication processing in the remote photography system 3.

The authentication application 1810 in the camera management server 30 performs image comparison and authentication using the remote image data 1811 and the terminal image data 1812 that are temporarily stored in the storage unit 402 (step S2018). The camera management server 30 detects motions of targets in the two pieces of image data 1811 and 1812, and when the motions of the targets in the two pieces of image data 1811 and 1812 are similar to each other, the camera management server 30 determines that the remote camera 10 and the user terminal 20 perform photography at the same photography spot. In the remote photography system 3, for example, the motions of pierrots dancing in photography spots are compared with each other, and the determination is made based on whether or not the pierros move in the same way.

The camera management server 30 repeats the processes in steps S2012 to S2018, until the authentication is completed (step S2019).

When the authentication is completed, the camera management server 30 deletes the terminal image data 1812 and the remote image data 1811 from the storage unit 402 and closes the authentication application 1810 (step S2020). Thereafter, the camera management server 30 reports an authentication result to the remote camera 10 and the user terminal 20 (steps S2021 and S2022).

Upon receiving the authentication result from the camera management server 30, the user terminal 20 checks whether or not the authentication succeeds (step S2023). If the authentication has succeeded, the process proceeds to the remote photography processing, and if the authentication has failed, the remote-camera operation application 710 is quit (step S2032).

The above description has been given of the user authentication processing in the remote photography system 3.

<3-3-3. Comparison and Authentication Processing on a Plurality of Images>

Next, the processes in steps S2012 to S2019 in FIGS. 20A and 20B will be described in more detail.

A pair of the remote image data 1811 and the terminal image data 1812 obtained at the same time in the processes in steps S2012 to S2017 is hereinafter referred to as an image pair.

The image comparison and authentication in step S2018 includes a feature extraction step of extracting pieces of feature data from an image pair, a feature comparison step of comparing the extracted pieces of feature data with each other, and an authentication determination step of determining whether or not the authentication succeeds or fails.

Figure 22A:
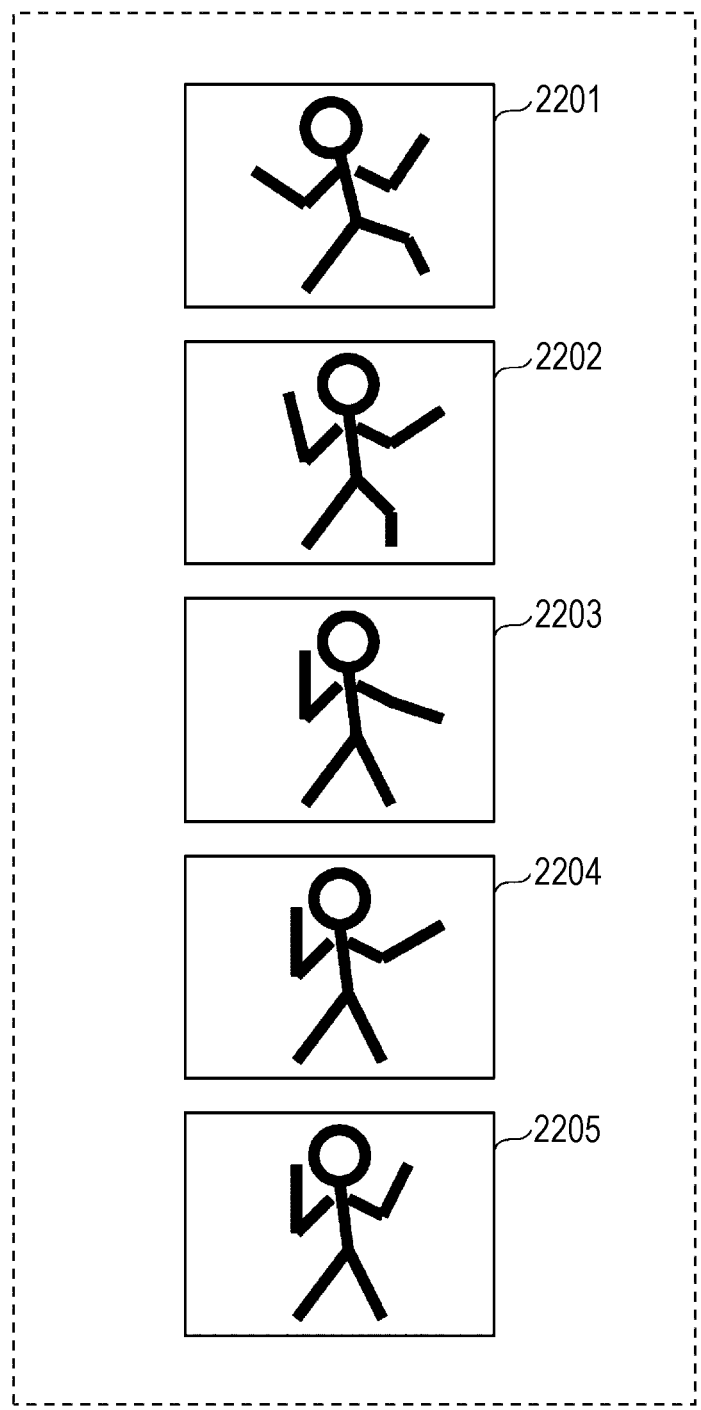
FIG. 22A is a schematic diagram illustrating feature data extracted from terminal image data.
Figure 22B:
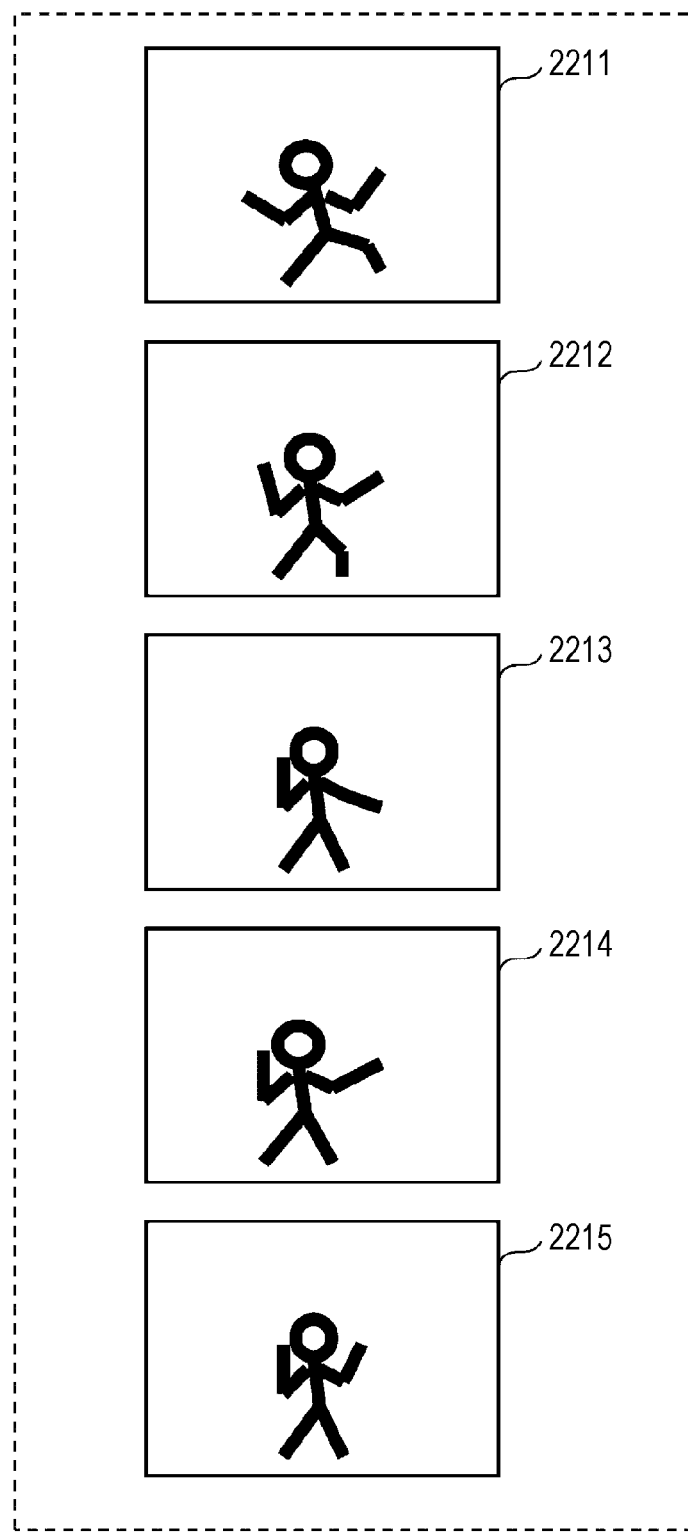
FIG. 22B is a schematic diagram illustrating feature data extracted from remote image data.

In the feature extraction step, areas that can be determined to correspond to a person are detected from the pieces of image data in the image pair, and pieces of feature data showing a pose of the person are extracted. FIG. 22A and FIG. 22B illustrate pieces of human-pose feature data extracted from a plurality of image pairs. FIG. 22A illustrates human-pose feature data extracted from the terminal image data 1812, and FIG. 22B illustrates human-pose feature data extracted from the remote image data 1811. Such linearly represented feature data can be obtained by, for example, detecting a plurality of human joint points from the image data and connecting the detected joint points on the basis of a human skeleton model.

In the feature comparison step, these pieces of linearly represented feature data are compared with each other, and a determination is made as to whether or not the people shown in two pieces of image data assume the same pose. Also, in order to determine whether or not the motions of targets match each other, the remote photography system 3 compares a plurality of image pairs acquired at regular intervals (e.g., 200 milliseconds). As illustrated in FIGS. 22A and 22B, the pose of a target changes with time. Thus, matching of pieces of feature data in a plurality of image pairs proves that the user is present in the photography spot at this point in time.

In the authentication determination step, it is determined that the authentication has succeeded when pieces of feature data in a number of image pairs which exceeds a threshold (e.g., 5) among image pairs acquired within a certain period of time (e.g., 5 seconds) match each other. For example, when the threshold is 5, it is determined that the authentication has succeeded when five pieces of feature data 2201 to 2205 in FIG. 22A match five pieces of feature data 2211 to 2215 in FIG. 22B.

Figure 23:
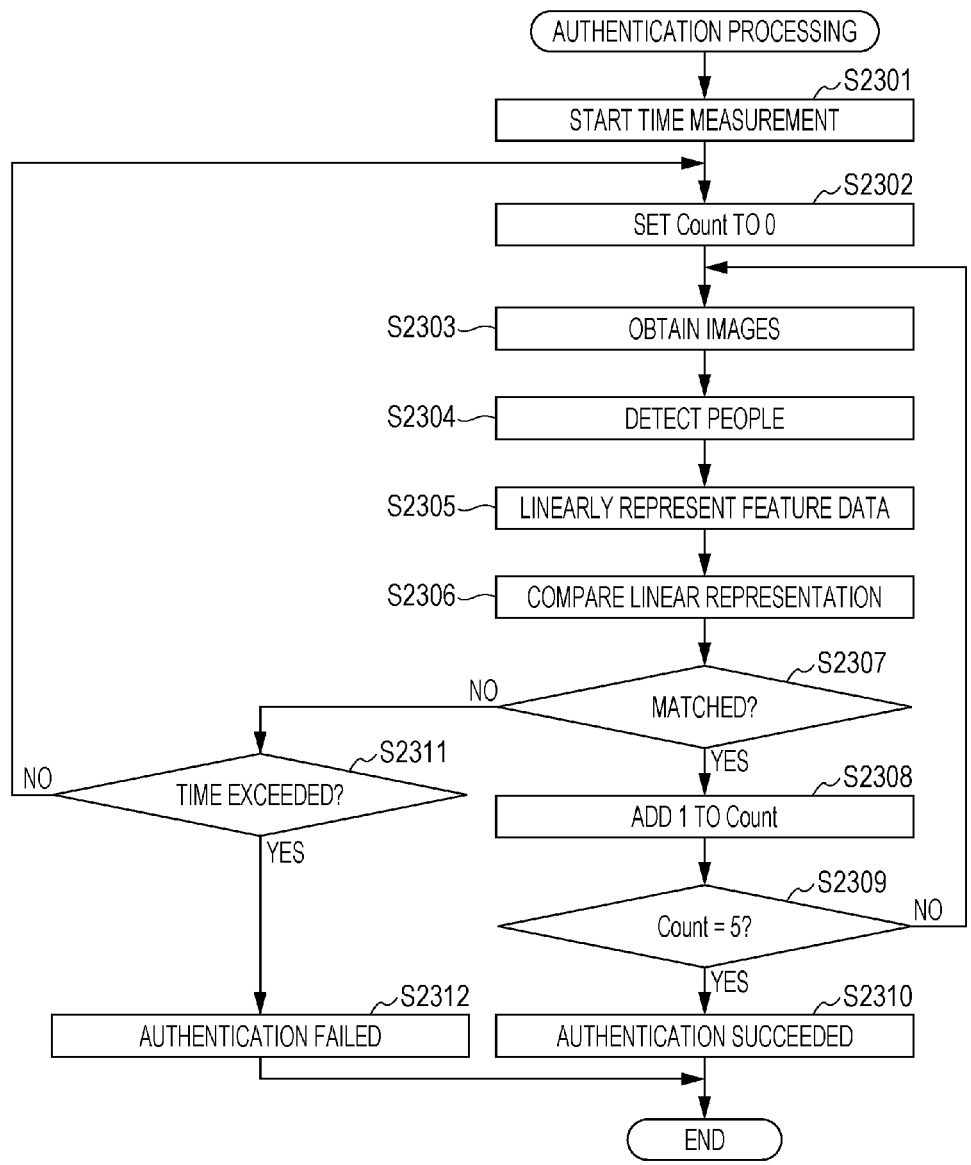
FIG. 23 is a flowchart illustrating one example of comparison-and-authentication processing on a plurality of image pairs.

FIG. 23 is a flowchart of comparison-and-authentication processing on the plurality of image pairs.

First, the authentication application 1810 in the camera management server 30 starts measurement of an elapsed time T1 (step S2301).

The authentication application 1810 sets a variable Count, which indicates the number of image pairs in which the pieces of feature data match each other, to 0 (step S2302).

The authentication application 1810 transmits photography instructions to the remote camera 10 and the user terminal 20 and then obtains an image pair (the remote image data 1811 and the terminal image data 1812) from the remote camera 10 and the user terminal 20 as responses to the photography instructions (step S2303).

With respect to the images in the image pair, the image-feature extraction module 1821 detects people (step S2304) and extracts (linearly representing) feature data of poses of the people (step S2305), and the feature comparison module 1822 compares the pieces of feature data in the image pair (step S2306).

The authentication determination module 1823 checks a comparison result (step S2307). If the pieces of feature data in the image pair match each other, the authentication determination module 1823 adds 1 to Count (step S2308). If Count reaches a threshold Th (e.g., Th=5) (YES in step S2309), the authentication determination module 1823 determines that the authentication has succeeded (step S2310).

If Count is smaller than the threshold Th in step S2309, the authentication determination module 1823 waits for a time T2 (e.g., T2=200 milliseconds), and then the process returns to step S2303 in which the authentication application 1810 obtains an image pair again.

If it is determined in step S2307 that the pieces of feature data in the image pair do not match each other, a determination is made as to whether or not the elapsed time T1 of which the measurement was started in step S2301 exceeds T3 (e.g., T3=5 seconds) (step S2311). Even if T3 is exceeded, when the pieces of feature data in image pairs corresponding to the threshold Th do not match, it is determined that the authentication has failed, and the authentication processing ends (step S2312). If the elapsed time T1 is within T3, the authentication determination module 1823 waits for the time T2, and the process returns to step S2302.

Determining motions of targets by using a plurality of acquired images, as described above, makes it possible to check whether or not the user who is operating the user terminal 20 is present in the photography range of the remote camera 10.

Since a large number of related techniques have been disclosed for an algorithm for detecting a human pose from acquired image data and an algorithm for determining whether or not human motions match each other, detailed descriptions thereof are not given herein. An algorithm to be employed is not limited to a particular algorithm and may be any algorithm that meets the effect of the present disclosure.

<3-4. Brief Conclusion>

According to the remote photography system 3, only when the user having the user terminal 20 is present in the photography spot of the remote camera 10, authority to operate the remote camera 10 is given to the user terminal 20. This allows the user who is present in the photography spot to perform photography using the remote camera 10, and can also prevent a user who is not present in the photography spot from remotely operating the remote camera 10.

4. Modifications

Although the three embodiments of the remote photography system according to the present disclosure have been described above, the remote photography system described above by way of example can be modified as described below, and it goes without saying that the present disclosure is not limited to the remote photography system as described above in each embodiment described above.

(1) Although an example in which the image comparison processing is executed by an apparatus other than the user terminal 20 has been described in each embodiment described above, the image comparison processing may be executed by each user terminal 20.

(2) In each embodiment described above, no particular description has been given of the identifiers and so on for identifying the individual apparatuses, such as the user terminals 20, the remote cameras 10, and the camera management server 30. It is, however, assumed that each apparatus is identified with, for example, an apparatus ID, an internet-protocol (IP) address, or the like, and pre-recognizes an identifier or the like of an apparatus that is another end of communication, so that the apparatuses can communicate with each other by using the identifiers or the like.

(3) In each embodiment described above, in the remote photography processing, the remote camera 10 may acquire a still image or may acquire a moving image.

(4) Although, in each embodiment, only the transmission of the photography instruction is described as the control on the remote camera 10 which is performed by the remote photography module 722 in the remote-camera operation application 710, the present disclosure is not limited thereto. The control on the remote camera 10 which is performed by the remote photography module 722 in the remote-camera operation application 710 may include, for example, an operation on the angle of view, such as panning, tilting, zooming, and an operation for a camera-specific setting function, such as focusing and diaphragm control.

(5) Although the above description in each embodiment has been given of a case in which, during the remote photography processing, the remote camera 10 performs photography under the control of the user terminal 20 in synchronization with touching of the photography-instruction input unit 702, the present disclosure is not limited thereto. For example, a delay may be provided so that the photography is performed when several seconds have passed after touching, like a camera with a self-timer function. With this arrangement, after touching, the user can hold a pose to perform photography.

(6) In the first embodiment, during the authentication photography processing, after the connection between the user terminal 20 and the remote camera 10 is completed, the user explicitly inputs the photography instruction by touching the photography-instruction input unit 702. However, the present disclosure is not limited to this method. For example, when the connection with the remote camera 10 (or the camera management server 30) is established, the remote-camera operation application 710 may execute the photography processing using the terminal camera 703 and/or the processing for transmitting the photography instruction to the remote camera 10, without the user explicitly inputting it.

(7) In the second and third embodiments, no particular description has been given of the remote camera 10 performing operations on the angle of view, such as panning, tilting, and zooming, during the authentication photography processing. However, during the authentication photography processing, the remote camera 10 may perform operations on the angle of view, such as panning, tilting, and zooming, in order to show a target in an easily recognizable manner.

(8) In the third embodiment described above, during the authentication photography processing, the user terminal 20 automatically performs photography, and the user is not notified about the photography. Consequently, the user does not know when the photography for the authentication is performed. Thus, the remote photography system may be configured so as to notify the user of the timing about photography. For example, a speaker may be provided in the user terminal 20 to output a shutter sound in synchronization with photography, thereby making it possible to notify the user about the timing of the photography.

In addition, in the remote photography processing in each embodiment, the user terminal 20 may also output a shutter sound in synchronization with the photography performed by the remote camera 10, to notify the user about the timing of the photography.

(9) Although, in each embodiment described above, the remote photography processing is performed independently from the authentication photography processing to acquire an image to be provided to the user, the image to be provided to the user is not limited thereto. The image to be provided to the user may also be, for example, an image acquired by the remote camera 10 during the authentication photography processing.

(10) Although, in each embodiment described above, pieces of feature data are extracted from images and are compared with each other in the user authentication processing, the feature-data extraction is not essential in the user authentication processing. For example, a determination as to whether or not an identical subject is captured in two images may be made by calculating the degree of dissimilarity or similarity between pixel values of the entire area or a partial area of one image and pixel values of the entire area or a partial area of another image and comparing the degree of dissimilarity or similarity with a threshold. For example, the sum of absolute differences (SAD), the sum of squared differences (SSD), or the like can be used for the degree of dissimilarity. For example, normalized cross-correlation (NCC) can be used for the degree of similarity.

(11) Although, in each embodiment described above, each image to be provided to the user is transmitted to the corresponding user terminal 20, a method for providing the image to the user is not limited thereto. Examples of the method for providing the image to the user include a method in which each image is made available in a form accessible using the user ID and a method in which each image is transmitted to a transmission destination associated with the user ID.

(12) In the third embodiment, the comparison-and-authentication processing is performed on a plurality of image pairs. The comparison-and-authentication processing on a plurality of image pairs can be modified so as to detect a difference between an internal clock in the user terminal 20 and an internal clock in the remote camera 10.

For example, before transmitting acquired remote image data to the camera management server 30, the remote camera 10 adds metadata indicating the time of the photography to the remote image data. Similarly, before transmitting acquired terminal image data to the camera management server 30, the user terminal 20 adds metadata indicating the time of the photography to the terminal image data. The camera management server 30 then compare the photography times added to the respective pieces of image data in an image pair in which the pieces of feature data match each other, to thereby detect a difference between the internal clock in the user terminal 20 and the internal clock in the remote camera 10.

In this case, when the pieces of feature data in the image pair match each other, it can be said that the two pieces of image data were acquired at the same point in time. Accordingly, when the internal clock in the user terminal 20 and the internal clock in the remote camera 10 match each other, the photography times indicated by the metadata added to the image pair in which the pieces of feature data match each other also should match each other. Conversely, when the internal clock in the user terminal 20 and the internal clock in the remote camera 10 differ from each other, the photography times indicated by the metadata added to the image pair in which the pieces of feature data match each other should also be different from each other. With this arrangement, it is possible to detect a difference between the internal clock in the user terminal 20 and the internal clock in the remote camera 10.

By detecting a difference between the internal clock in the user terminal 20 and the internal clock in the remote camera 10 in a manner described above, it is possible to improve the synchronization accuracy of the subsequent processes in the user terminal 20 and the remote camera 10. For example, this is useful for a case in which, during the remote photography processing, a shutter sound is output from the user terminal 20 in synchronization with the photography performed by the remote camera 10.

(13) A control program including machine-language or high-level-language program code for causing processors in the individual apparatuses and various circuits connected to the processors to execute the processing and so on associated with the connection-information receiving function, the photography control function, the image transmitting and receiving function, the remote operation function, the image display function, the target-information transmission function, the target-information receiving function, and so on described in the above embodiments can be recorded to recording media and can also be distributed through various types of communication channel and so on. Examples of such recording media includes an integrated-circuit (IC) card, a hard disk, an optical disk, a flexible disk, a read-only memory (ROM), and a flash memory. The distributed control program is stored in a memory or the like from which it can be read out to a processor and is used, and the processor executes the control program to thereby realize individual functions as described above in each embodiment. The processor not only directly executes the control program, but may also execute the control program through compilation or using an interpreter.

(14) The functional constituent elements (the communication unit 401, the photographic camera 601, the communication unit 602, the display unit 701, the photography-instruction input unit 702, the terminal camera 703, the communication unit 704, and so on) described in the above embodiments may be implemented in the form of circuitry for executing the functions thereof or may be realized by one or more processors executing a program.

The above-described functional constituent elements can typically be realized as a large-scale integration (LSI). The functional constituent elements may be individually integrated into single chips or at least one or all of the functional constituent elements may be integrated into a single chip. Although the functional constituent elements are implemented in the form of an LSI in this case, they may also be called an integrated circuit, a system LSI, a super LSI, or an ultra LSI depending on a difference in the degree of integration. The scheme for integrating the functional constituent elements into an integrated circuit is not limited to a scheme for LSI and may be realized with a dedicated circuit or a general-purpose processor. The functional constituent elements can also be implemented using a field programmable gate array (FPGA) that can be programmed after manufacture of an LSI or a reconfigurable processor that allows reconfiguration of connections or settings of circuit cells in an LSI. In addition, when a technology for circuit integration that replaces LSI becomes available with the advancement of semiconductor technology or another derivative technology, such a technology may also naturally be used to integrate the functional blocks. For example, biotechnology is applicable to the integration.

(15) The above-described embodiments and modifications may also be partly combined with each other.

5. Supplement

A description below will be given of the configurations of a remote photography system and a remote-camera control method according to one embodiment of the present disclosure.

(a) A remote-camera control method according to the present disclosure is directed to a remote-camera control method used for a remote photography system including a remote camera and a user terminal. The remote camera has a communication function and is installed at a position where a photography range of the remote camera includes a photography spot, and the user terminal has a communication function and a terminal camera. The method includes: obtaining first remote image data and terminal image data acquired by photography performed by the remote camera and the terminal camera in a same time segment; authenticating the user terminal by comparing the first remote image data and the terminal image data with each other and by determining that the user terminal is in the photography spot when an identical subject is found in both the first remote image data and the terminal image data; and providing second remote image data acquired by the remote camera to the user terminal after the user terminal is authenticated.

(b) The remote-camera control method according to the present disclosure may further include issuing, to the remote camera, an instruction for performing photography in the same time segment as a time segment of photography performed by the terminal camera. In the authenticating of the user terminal, the first remote image data and the terminal image data acquired by the photography in the same time segment may be compared with each other.

(c) In the remote-camera control method according to the present disclosure, the issuing of the instruction may include receiving, from the user terminal, the photography instruction input by a user and transmitting the received photography instruction from the user terminal to the remote camera.

(d) In the remote-camera control method according to the present disclosure, the issuing of the instruction may include: executing a program for operating the remote camera in the user terminal; establishing a connection between the user terminal and the remote camera; and transmitting the instruction for performing the photography from the user terminal to the remote camera, when the connection is established.

(e) The remote-camera control method according to the present disclosure may further include receiving, by the user terminal, the instruction for performing the photography in the same time segment, the instruction being issued by another apparatus in the remote photography system. In the obtaining of the remote image data and the terminal image data, the photography in the same time segment may be performed in response to the received instruction to obtain the terminal image data.

(f) The remote-camera control method according to the present disclosure may further include notifying a user of the user terminal about a photography timing of the photography in the same time segment.

(g) The remote-camera control method according to the present disclosure may further include designating a target that is present in the photography spot, and in the authenticating of the user terminal, a feature of the designated target may be compared.

(h) In the remote-camera control method according to the present disclosure, in the designating of the target, the target that is designated may be changed, each time the photography in the same time segment is executed.

(i) The remote-camera control method according to the present disclosure may further include displaying the designated target on a display unit included in the user terminal, during execution of the photography in the same time segment.

(j) The remote-camera control method according to the present disclosure may further include displaying the first remote image data, acquired by the remote camera, on a display unit included in the user terminal, during execution of the photography in the same time segment.

(k) The remote-camera control method according to the present disclosure may further include displaying the terminal image data, acquired by the terminal camera, on the display unit included in the user terminal, in parallel with the display of the first remote image data.

(l) The remote-camera control method according to the present disclosure may further include giving authority to operate the remote camera to the authenticated user terminal.

(m) The remote-camera control method according to the present disclosure may further include displaying the second remote image data, acquired by the remote camera, on a display unit included in the user terminal, when the user terminal to which the operation authority is given operates the remote camera.

(n) In the remote-camera control method according to the present disclosure, in the authenticating of the user terminal, the subject may be a person's face may be compared.

(o) In the remote-camera control method according to the present disclosure, in the authenticating of the user terminal, the subject may be a person's appearance.

(p) In the remote-camera control method according to the present disclosure, in the authenticating of the user terminal, the subject may be a person's body movement.

(q) In the remote-camera control method according to the present disclosure, the remote photography system may include a server having a communication function, and at least one of the obtaining of the first remote image data and the terminal image data, the authenticating of the user terminal, and the providing of the remote image data may be performed using a processor included in the server.

(r) A remote photography system according to the present disclosure is directed to a remote photography system including: a remote camera having a communication function and being installed at a position where a photography range of the remote camera includes a photography spot; and a user terminal having a communication function and a terminal camera. The remote camera includes; an obtainer that obtains first remote image data and terminal image data acquired by photography performed by the remote camera and the terminal camera in a same time segment; an authenticator that authenticates the user terminal by comparing the first remote image data and the terminal image data with each other and by determining that the user terminal is in the photography spot when an identical subject is found in both the first remote image data and the terminal image data; and a transmitter that transmits second remote image data acquired by the remote camera to the user terminal, after the user terminal is authenticated.

(s) A server according to the present disclosure is directed to a server in a remote photography system including a remote camera and a user terminal. T remote camera has a communication function and is installed at a position where a photography range of the remote camera includes a photography spot, and the user terminal has a communication function and a terminal camera. The server includes: an obtainer that obtains first remote image data and terminal image data acquired by photography performed by the remote camera and the terminal camera in a same time segment; an authenticator that authenticates the user terminal by comparing the first remote image data and the terminal image data with each other and by determining that the user terminal is in the photography spot when an identical subject is found in both the first remote image data and the terminal image data; and a transmitter that transmits second remote image data acquired by the remote camera to the user terminal, after the user terminal is authenticated.

The remote-camera control method according to the present disclosure provides, to only a user who is present in a photography spot, a service in which his or her hand-held portable terminal is used to perform photography using a camera installed at a photography spot. Accordingly, the remote-camera control method according to the present disclosure is preferably applied to systems for commemorative photography in sightseeing areas, theme parks, and so on.

What is claimed is:

1. A remote-camera control method used for a remote photography system including a remote camera and a user terminal, the remote camera having a communication function and being installed at a position where a photography range of the remote camera includes a photography spot, and the user terminal having a communication function and a terminal camera, the method comprising:

issuing, to the remote camera, an instruction for performing photography in the same time segment as a time segment of photography performed by the terminal camera;

obtaining first remote image data and terminal image data acquired by photography performed by the remote camera and the terminal camera in the same time segment;

authenticating the user terminal by comparing the first remote image data and the terminal image data acquired by the photography in the same time segment with each other and by determining that the user terminal is in the photography spot when an identical subject is found in both the first remote image data and in the terminal image data; and providing second remote image data acquired by the remote camera to the user terminal after the user terminal is authenticated.

2. The remote-camera control method according to claim 1, wherein the issuing of the instruction comprises receiving, from the user terminal, the photography instruction input by a user and transmitting the received photography instruction from the user terminal to the remote camera.

3. The remote-camera control method according to claim 1, wherein the issuing of the instruction comprises:
executing a program for operating the remote camera in the user terminal;
establishing a connection between the user terminal and the remote camera; and
transmitting the instruction for performing the photography from the user terminal to the remote camera, when the connection is established.

4. The remote-camera control method according to claim 1, further comprising:

receiving, by the user terminal, the instruction for performing the photography in the same time segment, the instruction being issued by another apparatus in the remote photography system, wherein, in the obtaining of the remote image data and the terminal image data, the photography in the same time segment is performed in response to the received instruction to obtain the terminal image data.

5. The remote-camera control method according to claim 4, further comprising:

notifying a user of the user terminal about a photography timing of the photography in the same time segment.

6. The remote-camera control method according to claim 1, further comprising:

designating a target that is present in the photography spot, wherein, in the authenticating of the user terminal, a feature of the designated target is compared.

7. The remote-camera control method according to claim 6, wherein, in the designating of the target, the target that is designated is changed, each time the photography in the same time segment is executed.

8. The remote-camera control method according to claim 6, further comprising:

displaying the designated target on a display included in the user terminal, during execution of the photography in the same time segment.

9. The remote-camera control method according to claim 1, further comprising:

displaying the first remote image data, acquired by the remote camera, on a display included in the user terminal, during execution of the photography in the same time segment.

10. The remote-camera control method according to claim 9, further comprising:

displaying the terminal image data, acquired by the terminal camera, on the display included in the user terminal, concurrently with the display of the first remote image data.

11. The remote-camera control method according to claim 1, further comprising:

giving authority, to operate the remote camera, to the authenticated user terminal.

12. The remote-camera control method according to claim 11, further comprising:

displaying the second remote image data, acquired by the remote camera, on a display included in the user terminal, when the user terminal to which the operation authority is given operates the remote camera.

13. The remote-camera control method according to claim 1, wherein, in the authenticating of the user terminal, the subject is a person's face.

14. The remote-camera control method according to claim 1, wherein, in the authenticating of the user terminal, the subject is a person's appearance.

15. The remote-camera control method according to claim 1, wherein, in the authenticating of the user terminal, the subject is a person's body movement.

16. The remote-camera control method according to claim 1, wherein the remote photography system includes a server having a communication function; and at least one of the obtaining of the first remote image data and the terminal image data, the authenticating of the user terminal, and the providing of the remote image data is performed using a processor included in the server.

17. A remote photography system, comprising:

a remote camera having a communication function and being installed at a position where a photography range of the remote camera includes a photography spot; and a user terminal having a communication function and a terminal camera, the user terminal issuing, to the remote camera, an instruction for performing photography in the same time segment as a time segment of photography performed by the terminal camera, wherein the remote camera includes an obtainer that obtains first remote image data and terminal image data acquired by photography performed by the remote camera and the terminal camera in the same time segment, an authenticator that authenticates the user terminal by comparing the first remote image data and the terminal image data acquired by the photography in the same time segment with each other and by determining that the user terminal is in the photography spot when an identical subject is found in both the first remote image data and the terminal image data, and a transmitter that transmits second remote image data acquired by the remote camera to the user terminal, after the user terminal is authenticated.

18. A server in a remote photography system including a remote camera and a user terminal, the remote camera having a communication function and being installed at a position where a photography range of the remote camera includes a photography spot, and the user terminal having a communication function and a terminal camera, the server comprising:

an issuer that issues, to the remote camera, an instruction for performing photography in the same time segment as a time segment of photography performed by the terminal camera;

an obtainer that obtains first remote image data and terminal image data acquired by photography performed by the remote camera and the terminal camera in the same time segment;

an authenticator that authenticates the user terminal by comparing the first remote image data and the terminal image data acquired by the photography in the same time segment with each other and by determining that the user terminal is in the photography spot when an identical subject is found in both the first remote image data and the terminal image data; and a transmitter that transmits second remote image data acquired by the remote camera to the user terminal, after the user terminal is authenticated.

19. The remote photography system according to claim 17, wherein, the authenticator changes the identical subject, each time the photography in the same time segment is executed.

20. The server according to claim 18, wherein, the authenticator changes the identical subject, each time the photography in the same time segment is executed.

* * * * *